(12) United States Patent
Andersson

(10) Patent No.: US 11,933,358 B2
(45) Date of Patent: Mar. 19, 2024

(54) FURNITURE ROTARY SYSTEM HAVING REDUCED FRICTION, AND A PIECE OF FURNITURE COMPRISING SUCH SYSTEM

(71) Applicant: IKEA SUPPLY AG, Pratteln (CH)

(72) Inventor: Benny Andersson, Älmhult (SE)

(73) Assignee: IKEA SUPPLY AG, Pratteln (CH)

( * ) Notice: Subject to any disclaimer, the term of this patent is extended or adjusted under 35 U.S.C. 154(b) by 626 days.

(21) Appl. No.: 16/490,803

(22) PCT Filed: Mar. 2, 2018

(86) PCT No.: PCT/SE2018/050201
§ 371 (c)(1),
(2) Date: Sep. 3, 2019

(87) PCT Pub. No.: WO2018/160128
PCT Pub. Date: Sep. 7, 2018

(65) Prior Publication Data
US 2020/0003258 A1    Jan. 2, 2020

(30) Foreign Application Priority Data

Mar. 3, 2017 (SE) .................................. 1750236-0

(51) Int. Cl.
*B60B 33/00* (2006.01)
*A47B 9/04* (2006.01)
(Continued)

(52) U.S. Cl.
CPC .............. *F16C 29/045* (2013.01); *A47B 9/04* (2013.01); *A47B 49/00* (2013.01); *A47B 88/41* (2017.01);
(Continued)

(58) Field of Classification Search
CPC ........... A47B 88/41; A47B 9/04; A47B 49/00; A47B 91/00; A47B 91/02; A47B 91/12;
(Continued)

(56) References Cited

U.S. PATENT DOCUMENTS 2,627,447 A     7/1948  Cook
2,743,971 A  *  5/1956  Kramcsak, Jr. ......... B60B 37/10
                                                      384/489

(Continued)

FOREIGN PATENT DOCUMENTS

CA        2215925       9/1996
CA        2437147 A1    2/2005
(Continued)

OTHER PUBLICATIONS

Indonesian Office Action for ID Application No. PID201802483 dated Apr. 27, 2022 (4 pages).
(Continued)

*Primary Examiner* — Chuck Y Mah
(74) *Attorney, Agent, or Firm* — Merchant & Gould P.C.

(57) ABSTRACT

A furniture rotary system (100, 200, 300, 400, 500) for a piece of furniture (10, 20, 30, 40, 50) is provided. The furniture rotary system is forming a sliding rotary connection between a rotational member (120, 210, 320, 410, 520) and a stationary member (110, 220, 310, 420, 510), wherein said furniture rotary system (100, 200, 300, 400, 500) comprises at least one sliding surface (114, 214, 314, 414, 514) being coated with a lacquer comprising a resin, wherein said lacquer in turn is at least partly coated with a lipophilic composition coating to provide a slide layer with a lowered friction.

21 Claims, 16 Drawing Sheets

(51) Int. Cl.
*A47B 49/00* (2006.01)
*A47B 88/41* (2017.01)
*B60B 19/12* (2006.01)
*E05D 7/081* (2006.01)
*F16C 29/04* (2006.01)
*F16C 33/20* (2006.01)

(52) U.S. Cl.
CPC .............. *B60B 19/12* (2013.01); *E05D 7/081* (2013.01); *F16C 33/206* (2013.01); *E05Y 2900/20* (2013.01); *F16C 2314/72* (2013.01)

(58) Field of Classification Search
CPC ......... A47B 91/14; A47B 91/16; A47B 91/06; A47B 2091/063; B60B 19/12; B60B 33/00; B60B 2033/0034; B60B 2900/5112; B65G 7/02; A47C 7/002; A47C 7/008; A61H 3/0288; A61H 3/068; F16C 29/045; F16C 33/206; F16C 33/205; F16C 2314/72; E05D 7/081; E05Y 2900/20
See application file for complete search history.

(56) References Cited

U.S. PATENT DOCUMENTS

| | | | |
|---|---|---|---|
| 3,185,530 | A | 5/1965 | Reiss, Sr. et al. |
| 3,622,473 | A | 11/1971 | Ohta |
| 3,755,093 | A | 8/1973 | Suematsu |
| 4,011,696 | A * | 3/1977 | Klein ...................... A47H 1/04 52/39 |
| 4,088,589 | A | 5/1978 | Rossi et al. |
| 4,138,176 | A | 2/1979 | Cowdro |
| 4,653,139 | A * | 3/1987 | Vollberg ............. B60B 33/0002 16/35 R |
| 5,171,622 | A | 12/1992 | Wegner |
| 5,325,732 | A | 7/1994 | Vogel |
| 5,549,377 | A | 8/1996 | Krivec |
| 5,735,610 | A | 4/1998 | Damon et al. |
| 5,981,448 | A | 11/1999 | Matsui |
| 6,004,909 | A | 12/1999 | Lindman |
| 6,225,404 | B1 | 5/2001 | Sorensen et al. |
| 6,315,451 | B1 | 11/2001 | Michioka et al. |
| 6,427,286 | B1 * | 8/2002 | Erskine ............... E05D 15/0647 16/93 R |
| 6,463,625 | B2 * | 10/2002 | Mittag ................ E05D 15/0639 16/105 |
| 6,696,143 | B1 | 2/2004 | La Point |
| 6,855,676 | B2 | 2/2005 | Li et al. |
| 8,697,350 | B2 | 4/2014 | Ruegg et al. |
| 11,229,286 | B2 | 1/2022 | Anderson |
| 2003/0176302 | A1 | 9/2003 | Li |
| 2003/0213698 | A1 | 11/2003 | Kawagoshi et al. |
| 2004/0098831 | A1 * | 5/2004 | Elmer ................... E05D 15/063 16/89 |
| 2008/0092450 | A1 * | 4/2008 | Balduck ............. E05D 15/0652 49/404 |
| 2008/0125338 | A1 | 5/2008 | Corbett et al. |
| 2009/0108667 | A1 * | 4/2009 | Clark ...................... B60B 27/02 301/105.1 |
| 2010/0297440 | A1 | 11/2010 | Noll |
| 2011/0177987 | A1 | 7/2011 | Lenting et al. |
| 2012/0240350 | A1 | 9/2012 | Natu |
| 2014/0142014 | A1 | 5/2014 | Thompson et al. |
| 2015/0361274 | A1 | 12/2015 | Domes et al. |
| 2016/0319211 | A1 | 11/2016 | Barth et al. |
| 2016/0340951 | A1 * | 11/2016 | Andrén ................ E05D 15/063 |
| 2017/0175811 | A1 | 6/2017 | Zimmermann |
| 2018/0335078 | A1 | 11/2018 | Andersson |
| 2019/0353202 | A1 * | 11/2019 | Wang .................. F16C 33/6696 |

FOREIGN PATENT DOCUMENTS

| | | |
|---|---|---|
| CH | 334983 | 12/1958 |
| CN | 85201950 U | 6/1986 |
| CN | 1223675 A | 7/1999 |
| CN | 1279922 A | 1/2001 |
| CN | 1385482 A | 12/2002 |
| CN | 1488857 A | 4/2004 |
| CN | 1601127 A | 3/2005 |
| CN | 2762638 Y | 3/2006 |
| CN | 1982675 A | 6/2007 |
| CN | 101018922 A | 8/2007 |
| CN | 101035959 A | 9/2007 |
| CN | 101235887 A | 8/2008 |
| CN | 201190490 Y | 2/2009 |
| CN | 101390688 A | 3/2009 |
| CN | 201835661 U | 5/2011 |
| CN | 102264882 A | 11/2011 |
| CN | 102307499 A | 1/2012 |
| CN | 202128137 U | 2/2012 |
| CN | 202436824 | 9/2012 |
| CN | 103104609 A | 5/2013 |
| CN | 203073681 U | 7/2013 |
| CN | 103573075 A | 2/2014 |
| CN | 203483162 U | 3/2014 |
| CN | 103867062 A | 6/2014 |
| CN | 104498138 A | 4/2015 |
| CN | 105378202 A | 3/2016 |
| CN | 205214604 U | 5/2016 |
| CN | 106308153 A | 1/2017 |
| CN | 108135356 A | 6/2018 |
| CN | 108135363 A | 6/2018 |
| CN | 108135378 A | 6/2018 |
| CN | 108136435 A | 6/2018 |
| CN | 108348065 A | 7/2018 |
| DE | 2203378 A1 | 8/1973 |
| DE | 3613313 | 10/1987 |
| DE | 3613313 A1 | 10/1987 |
| DE | 29813478 U1 | 11/1998 |
| DE | 29813478 U1 | 12/1998 |
| DE | 19924642 C2 | 5/1999 |
| EP | 985793 A1 | 3/2000 |
| EP | 1153560 A2 | 11/2001 |
| EP | 1568299 B1 | 8/2005 |
| EP | 2957784 A1 | 12/2015 |
| FR | 1467583 | 1/1967 |
| GB | 1126855 | 9/1968 |
| GB | 1126855 A | 9/1968 |
| JP | H05 76447 A | 3/1993 |
| JP | H06-136304 A | 5/1994 |
| JP | 2003-268194 | 9/2003 |
| JP | 2005-042304 | 2/2005 |
| JP | 2005042304 A | 2/2005 |
| JP | 2006062328 A | 3/2006 |
| SU | 1690664 A1 | 11/1991 |
| WO | 9424912 A1 | 11/1994 |
| WO | 2006/022669 A1 | 3/2006 |
| WO | 2014160428 A1 | 10/2014 |
| WO | 2015051892 | 4/2015 |
| WO | 2017042201 A1 | 3/2017 |
| WO | 2017042203 A1 | 3/2017 |
| WO | 2017042228 A1 | 3/2017 |
| WO | 2017044032 A1 | 3/2017 |
| WO | 2017044034 | 3/2017 |

OTHER PUBLICATIONS

International Search Report for International Application No. PCT/SE2018/050201 dated Apr. 12, 2018 (5 pages).
Chinese Office Action for CN Application No. 201680058930.X dated Apr. 8, 2022 (24 pages, with English translation).
Teaching Books of East China Central China Higher Forestry College (School), "Wood Processing Materials (First draft)", Edited by the Textbook Review Committee of the East China Central China Higher Forestry College (School), p. 179, China Forestry Publishing House, published on Sep. 1959 (Machine Translation).
Supplemental European Search Report for EP Application No. 18760931.8 dated Dec. 3, 2020 (5 pages).

(56) References Cited

OTHER PUBLICATIONS

Roleria et al. "Lipophilic phenolic antioxidants: Correlation between antioxidant profile, partition coefficients and redox properties." Bioorganic & Medicinal Chemistry vol. 18 (2010), pp. 5816-5825.
Furey et al. "The Effect of Lubricant Viscosity on Metallic Contact and Friction in a Sliding System." Tribology Transactions, vol. 5, No. 1 (Jan. 1962) pp. 149-159.
Anonymous "Liquid Petroleum or "Russian Mineral Oil"" J. of Pharmaceutical Sciences, vol. 3, No. 7 (Jul. 1914), pp. 1013-1018.
Anonymous "Regulation (EC) No. 1935/2004 of European Parliament and of the Council of Oct. 27, 2004 on material and articles intended to come into contact with food and repealing Directives 80/590/EEC and 89/109/EEC." Office Journal of European Union, (Nov. 2004), pp. 1-14.
Anonymous "Standard Test Method of Total Iodine Value of Drying Oils and Their Derivatives (D 1541-97) withdrawn." (Jan. 1997), pp. 1-4. Retrieved from the Internet: url:www.astm.org.
Chinese Office Action for CN Application No. 201680058930.X dated May 12, 2021 (16 pages).
Office Action for U.S. Appl. No. 15/757,541 dated Apr. 15, 2020 (21 pages).
Chinese Office Action for CN Application No. 201680059025.6 dated Mar. 19, 2020 (20 pages), English translation provided.
Hussein et al. "Enhancement of the Wear Resistance and Microhardness of Aluminum Alloy by Nd:YaG Laser Treatment." The Scientific World Journal, vol. 2014, Article ID 842062, pp. 1-5 (2014).
Chinese Office Action for CN Application No. 201680059028.X dated Mar. 2, 2021 (19 pages, with English translation).
Liu et al., "Tribology Basis and Application, " Xi'an Jiaotong University Press, 2015.
Xu, "Plastic Materials," China Light Industry Press, 1999.
Chinese Office Action for CN Application No. 201880015300.3 dated Sep. 3, 2021 (25 pages, with English translation).
Klamann, "Lubricants and Related Products," Hydrocarbon Processing Press, 1990, p. 26.
Chinese Office Action for CN Application No. 201880015095.0 dated Sep. 13, 2021 (27 pages, with English translation).
Yin et al., "Tribological Properties of Epoxy Adhesive Lubricating Coating," Polymer Materials Science & Engineering, 2011, 9:80-83, 87 (with English translation).
Extended European Search Report dated Nov. 27, 2023 for corresponding European patent application No. 23184719.5 (6 pages).

* cited by examiner

A-A

FURNITURE ROTARY SYSTEM HAVING REDUCED FRICTION, AND A PIECE OF FURNITURE COMPRISING SUCH SYSTEM

This application is a National Stage Application of PCT/SE2018/050201, filed 2 Mar. 2018, which claims benefit of Ser. No. 17/502,360, filed 3 Mar. 2017 in Sweden and which applications are incorporated herein by reference. To the extent appropriate, a claim of priority is made to each of the above disclosed applications.

TECHNICAL FIELD

The present invention relates to a furniture rotary system for a piece of furniture, and to furniture comprising such furniture rotary system. More particularly the present invention relates to various furniture rotary systems having reduced friction.

BACKGROUND

Furniture may be provided with furniture rotary systems allowing for one part of the furniture to rotate and/or turn relative a second part. Such systems may be implemented to provide different functionalities, e.g. hinges for cabinets, supports for shelves, etc.

As furniture is supposed to withstand long-term use and loads robustness of the rotary systems is an important factor in designing and manufacturing such furniture. Therefore the furniture rotary systems are normally high quality components allowing for frequent operation without risking substantial wear or damage. So far such approach normally involves expensive components contributing to an increased total cost of the piece of furniture.

In view of the problem mentioned there is a need for an improved furniture rotary system for furniture which allows for a simple and cost effective structure and manufacturing, while still allowing for reliable and robust operation.

SUMMARY

An object of the present invention is to provide a furniture rotary system for a piece of furniture overcoming the above mentioned drawbacks of prior art and at least partly solving the problems associated with the prior art systems.

This object is achieved by utilizing a novel concept for furniture rotary systems, and to provide furniture according to this concept. The novel concept is based on the principle of having a sliding surface with very low sliding friction. The sliding surface is coated with a lacquer comprising a resin. The lacquer is in turn at least partly coated with a lipophilic composition coating to provide a slide layer with lowered friction. The sliding surface may for example be formed on an aluminum member, preferably having an anodized oxide surface layer, onto which the lacquer is applied. As an example, the surface may be formed on an aluminum member having been electrophoretically, preferably anaphoretically coated with an acrylic resin and subsequently heat cured to form the lacquer coated on the sliding surface. Preferably, the aluminum member has an anodized oxide surface layer onto which the lacquer is applied. The Honny process or one of its derivatives may be used to obtain such anodized, lacquered surfaces. Whereas the thickness of the anodized oxide surface layer preferably is at least 5 micrometers, the thickness of the lacquer of the sliding surface may preferably be 100 micrometers or less. The lipophilic composition coating typically comprises compounds comprising C6 to C40, such as C8 to C30, non-aromatic hydrocarbyl groups, such as alkenyl groups and/or alkyl groups, e.g. alkyl groups.

According to another embodiment the sliding surface is made from steel, onto which the lacquer is applied. Steel is a generally strong, hard and comparably cheap material that can be used as a starting material for the sliding surface. Steel surfaces may be lacquered by electrocoating or autodeposition to provide a lacquer layer with uniform thickness.

The sliding surface, and the member exhibiting such sliding surface, is arranged to be in sliding engagement with at least one sliding member. The interface between the sliding surface and the sliding member allows for a rotational movement of the sliding member relative the member carrying the sliding surface. The part of said sliding member to slide over the sliding surface may be configured as one or more blades having a circumferential extension in the sliding direction. Further, the sliding surface may be present in a groove extending in the circumferential direction of the member being provided with the sliding surface. The sliding member comprises at least one individual contact point in contact with the sliding surface. The contact area of each individual contact point may be less than 3 mm2. Further, the contact pressure in the at least one contact point may be at least 4 N/mm2.

According to a first aspect of the invention, a furniture rotary system for a piece of furniture is provided. The furniture rotary system is forming a sliding rotary connection between a rotational member and a stationary member, wherein said furniture rotary system comprises at least one sliding surface being coated with a lacquer comprising a resin, wherein said lacquer in turn is at least partly coated with a lipophilic composition coating to provide a slide layer with a lowered friction.

The sliding surface may be arranged in the horizontal plane, and the rotational member is arranged to rotate around a vertical axis.

The sliding surface may be arranged as a cylinder surface extending around a horizontal axis, and the rotational member is arranged to rotate around a horizontal axis.

The sliding surface may be provided on one of the stationary member and the rotational member, and the other one of said stationary member and said rotational member is in sliding contact with the sliding surface.

That member being in sliding contact with the sliding surface may comprise at least one blade extending in the rotational direction. Blades have been found to provide for low friction. Preferably the length of the blade, as seen along the sliding direction of the rotational member, being 2-70 mm, more preferably 3-50 mm. A short length of the blade has been found beneficial for low friction.

According to one embodiment each blade is relatively short, the length of the blade, as seen along the sliding direction of the rotational member, being 2-15 mm, more preferably 3-10 mm. In some applications this provides for very low friction.

That member being in sliding contact with the sliding surface preferably comprises at least two separate blades. This provides for a more stable rotary system with low friction. In addition each blade need not be that long.

That member being in sliding contact with the sliding surface may comprise at least three separate blades running along the same circular path during rotation. This provides for good distribution of forces and a low friction.

Each blade may form one individual contact point in contact with the sliding surface, the contact area of each individual contact point being less than 3 $mm^2$, more preferably less than 1.5 mm², and most preferably less than 0.75 mm² A low contact surface has been found to be beneficial for the friction. Preferably the contact pressure in each contact point is at least 4 N/mm², preferably at least 8 N/mm², and more preferably at least 12 N/mm², and wherein preferably the contact pressure is lower than the strain at yield of the material of the member comprising the blade at the contact point. A relatively high contact pressure has been found to be beneficial to reduce the friction.

The sliding surface may be provided with one or more depressions for receiving one or more blades. This may provide for improved control of the lateral position of that member to which the blade/-s is/are connected.

That member being in sliding contact with the sliding surface may be made of a plastic, preferably a plastic comprising a polymer with polar groups, more preferably the polar groups are selected from the group consisting of hydroxyl groups, carboxylic acid groups, amide groups, halide groups, sulfide groups, cyano groups (nitrile groups), carbamate groups, aldehyde groups, and/or ketone groups. Preferably said plastic comprising a polymer selected from the group of polymers consisting of polyoxymethylenes (POM), polyesters (e.g. thermoplastic polyesters, such as polyethylene terephthalate (PET), polytrimethylene terephthalate (PTT), polybutylene terephthalate (PBT), and poly-lactic acid (PLA), as well as bio-based thermoplastic polyesters, such as polyhydroxyalkanoates (PHA), polyhydroxybutyrate (PHB), and polyethylene furanoate (PEF)), polyamides (PA), polyvinyl chloride (PVC), polyphenylene sulfide (PPS), polyaryletherketone (PAEK; e.g. Polyether ether ketone (PEEK)), and Polytetrafluoroethylene (PTFE). These polymers have been found to be efficient for co-operating with the sliding surface having the lipophilic composition provided thereon.

That member being in sliding contact with the sliding surface may in its entirety be made from a plastic. This may provide for low production cost and robust function.

The sliding surface may be made from a material having a Vickers hardness of at least 50 MPa, preferably at least 100 MPa, still more preferably at least 150 MPa, such as metal or glass, preferably the material is a metal. These materials provide for low friction function in combination with durable operation.

The sliding surface may be made of aluminum and/or steel. These materials are hard and durable and suitable for efficient furniture production.

The sliding surface may be made of aluminum having a surface layer onto which the lacquer is applied, preferably the surface layer is an anodized oxide surface layer. The anodized oxide surface layer provides for improved durability of the lacquer. Preferably the thickness of the anodized oxide surface layer is at least 5 micrometers, more preferably at least 10 micrometers.

The resin of the lacquer may comprise polar groups, such as hydroxyl groups, carboxylic acid groups, amide groups, cyano groups (nitrile groups), halide groups, sulfide groups, carbamate groups, aldehyde groups, and/or ketone groups.

The resin of the lacquer may be a thermosetting resin.

The resin of the lacquer may be selected from the group consisting of: acrylic resins, acrylate resins, acrylamide resins, methacrylate resins, methyl metachrylate resins, acrylonitrile resins, styrene-acrylonitril resins, acrylonitrile styrene acrylate resins, reaction products or a mechanical mixture of alkyd resin and water-soluble melamine resin, reaction products or a mechanical mixture of a vinyl-modified unsaturated alkyd resin and a water-soluble melamine resin, and polymers and mixtures of one or several of these resins, preferably the resin of the lacquer is an acrylic resin, such as an acrylate resin, an acrylamide resin, a methacrylate resin, or a methyl metachrylate resin and mixtures thereof.

The thickness of the lacquer coated on the sliding surface may be 100 μm or less, preferably 75 μm or less, more preferably 5 to 75 μm, even more preferably 50 μm or less, still more preferably 10 to 50 μm, and yet more preferably 15 to 40 μm. These thicknesses provide for low friction and durable operation.

The sliding surface may have been lacquered by electro coating or autodeposition in a bath containing the lacquer, or by electrostatic coating with a powder lacquer, or by wet spraying with a liquid lacquer; preferably the sliding surface has been lacquered by electro coating in a bath containing the lacquer or by electrostatic coating with a powder lacquer. These methods provide for a very even thickness of the lacquer, which is beneficial for low friction.

The sliding surface may be formed by an aluminum member having a surface layer onto which the lacquer is applied, preferably the surface layer is an anodized oxide surface layer, preferably the thickness of the anodized oxide surface layer is at least 5 micrometers, more preferably at least 10 micrometers, and wherein the surface layer has been electrophoretically, such as anaphoretically, coated with a resin, such as an acrylic resin, and subsequently heat cured to form the lacquer coated on the sliding surface, preferably the sliding surface has been coated using the Honny process or one of its derivatives.

The lipophilic composition coating may comprise compounds comprising C6 to C40, such as C8 to C30, or even C10 to C24, non-aromatic hydrocarbyl groups, such as alkenyl groups and/or alkyl groups, e.g. alkyl groups. Preferably the lipophilic composition coating present on the lacquer comprises at least 25 wt. %, such as at least 50 wt. %, of compounds comprising C6 to C40, such as C8 to C30, alkyl groups, more preferably the lipophilic composition coating present on the lacquer comprises at least 25 wt. %, such as at least 50 wt. %, C6 to C40, such as C8 to C30, non-aromatic hydrocarbons, such as alkenes and/or alkanes, e.g. alkanes.

The lipophilic composition coating present on the lacquer may comprise triglycerides and/or fatty acids. Preferably said triglycerides, if present, comprises at least 75% saturated fatty acid residues and said fatty acids, if present, comprises at least 75% saturated fatty acids. More preferably the lipophilic composition coating present on the lacquer comprises 1 to 40 wt. % triglycerides and/or fatty acids. Preferably said triglycerides, if present, being composed of fatty acids with C6 to C40, such as C8 to C30, alkyl groups, and preferably said fatty acids, if present, having C6 to C40, such as C8 to C30, alkyl groups. Still more preferably the lipophilic composition coating present on the lacquer comprises at least 5 wt. %, such as at least 10 wt. %, of triglycerides and/or fatty acids, preferably said triglycerides, if present, being composed of fatty acids with C6 to C40, such as C8 to C30, alkyl groups, and preferably said fatty acids, if present, having C6 to C40, such as C8 to C30, alkyl groups.

At least one of the rotational member and the stationary member may comprise both a horizontal and a vertical sliding surface to provide support for the other member in both vertical and horizontal direction, such as in a hinge arrangement of a door leaf or in a furniture turning plate. This provides for stable and reliable function with low friction. Preferably said other member is provided with both vertical and horizontal blades adapted for sliding against said horizontal and vertical sliding surfaces. This further supports the low friction.

At least one of the rotational member and the stationary member may be a threaded rod, and the other member being a nut co-operating with the threaded rod to provide a furniture extension system, such as a furniture extension system for a sit to stand table, preferably one of the nut and the threaded rod being provided with blades co-operating with a sliding surface arranged on the other member. This provides for low friction, thereby reducing the power needed to operate the furniture extension system.

The rotational member may be arranged on a wheel member of a wheel arrangement, and wherein the stationary member is arranged on a furniture mounting part adapted for mounting the wheel arrangement to a piece of furniture. This provides for furniture wheels that rotate at low friction. Preferably at least one of said rotational member and said stationary member having the function of being a shaft of the wheel member. This provides for reduced cost of the wheel arrangement as the shaft function and sliding function are combined. Preferably one of the rotational member and the stationary member is provided with blades co-operating with a sliding surface arranged on the other member. This further reduces the friction.

According to a second aspect, a cabinet is provided having at least one swinging door attached to it. The at least one door is rotatably connected to the cabinet by means of a rotary system according to the first aspect.

The sliding surface may be provided on a circular member which is securely attached to the cabinet, or which is securely attached to the at least one door.

According to a third aspect, a sit to stand table is provided having at least one leg being adjustable in height direction by means of a rotary system according to the first aspect.

The sit to stand table may further comprise an electrical motor being in drive connection with a threaded rod. Preferably said threaded rod is provided with the sliding surface.

The sit to stand table may further comprise a stationary nut in threaded connection with the threaded rod. Preferably the nut is fixedly attached to a lower cylinder being received by a sleeve-like member.

According to a fourth aspect, a wheel arrangement is provided comprising a shaft and a hub together forming a rotary system according to the first aspect.

The shaft may form a stationary member being provided with the sliding surface.

According to a fifth aspect a wheel arrangement is provided comprising a fixed support and a rotatable rim, together forming a rotary system according to the first aspect.

The rim may form a rotational member being provided with the sliding surface.

According to a sixth aspect a furniture turning plate is provided, wherein the furniture turning plate comprises a rotary system according to the first aspect.

The furniture turning plate may comprise an upper part and a lower part being connected to each other by means of the rotary system.

The upper part may be provided with a circular member being received by an insert at the lower part, said insert forming a stationary part of the rotary system, one of said circular member and said insert having the sliding surface.

BRIEF DESCRIPTION OF DRAWINGS

The invention will be described in further detail below under reference to the accompanying drawings, in which.

DETAILED DESCRIPTION

Figure 1:
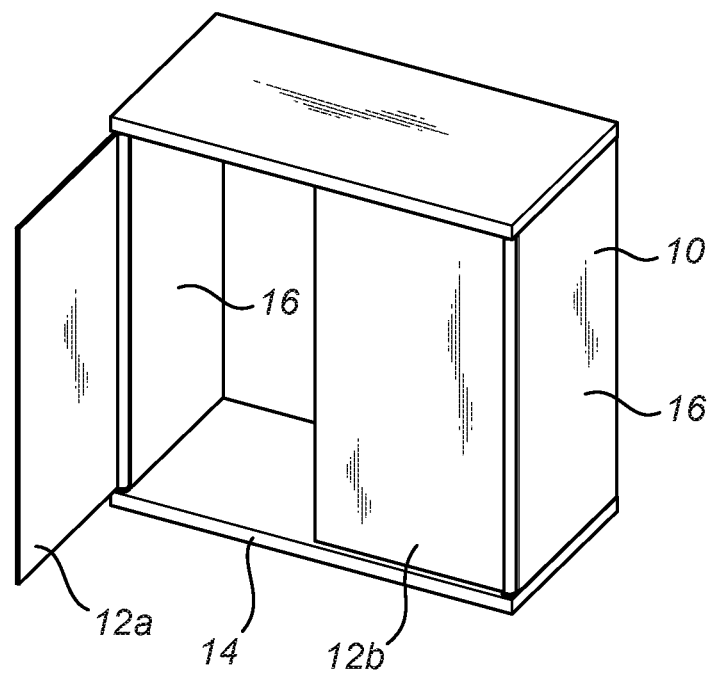
FIG. 1 is an isometric view of a cabinet.
Figure 2:
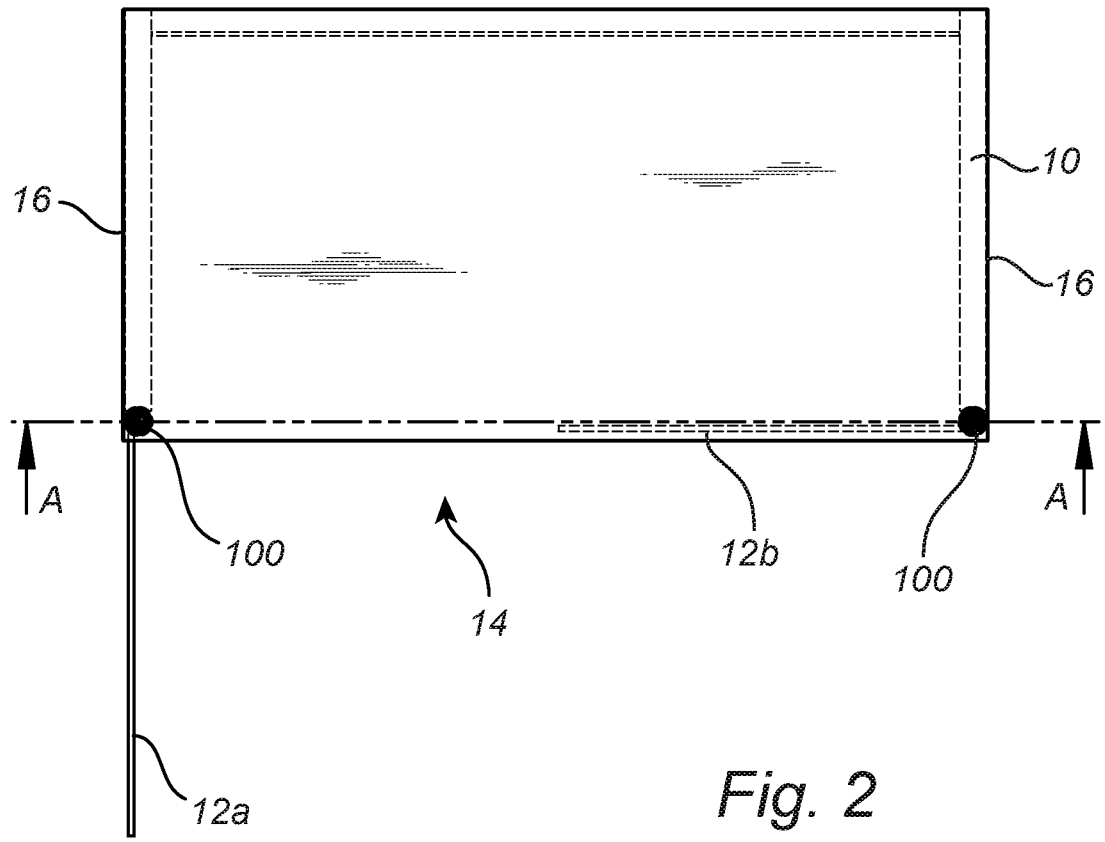
FIG. 2 is a cross-sectional view of the cabinet of FIG. 1, showing two rotary systems.

Starting in FIGS. 1-7, a first example of a piece of furniture having a furniture rotary system will be described. FIG. 1 shows a cabinet 10 having two swinging doors 12*a*, 12*b* attached to it. As can be seen in FIG. 2 each swinging door 12*a-b* is connected to the fixed cabinet by means of a furniture rotary system 100, allowing for each door 12*a-b* to rotate between an open position and a closed position. In FIG. 2 the left door 12*a* is arranged in the open position, while the right door 12*b* is arranged in the closed position. The closed position is typically defined by the door 12*a-b* coming into contact with the front end 14 of the cabinet 10 thus preventing the door 12*a-b* to move further inwards, while the end position of the open position may be provided by means of a stop of the rotary system 100. Alternatively the open position may correspond to a door 12*a-b* being rotated until the front side of the door 12*a-b* comes into contact with the exterior side 16 of the cabinet 10.

Figure 3:
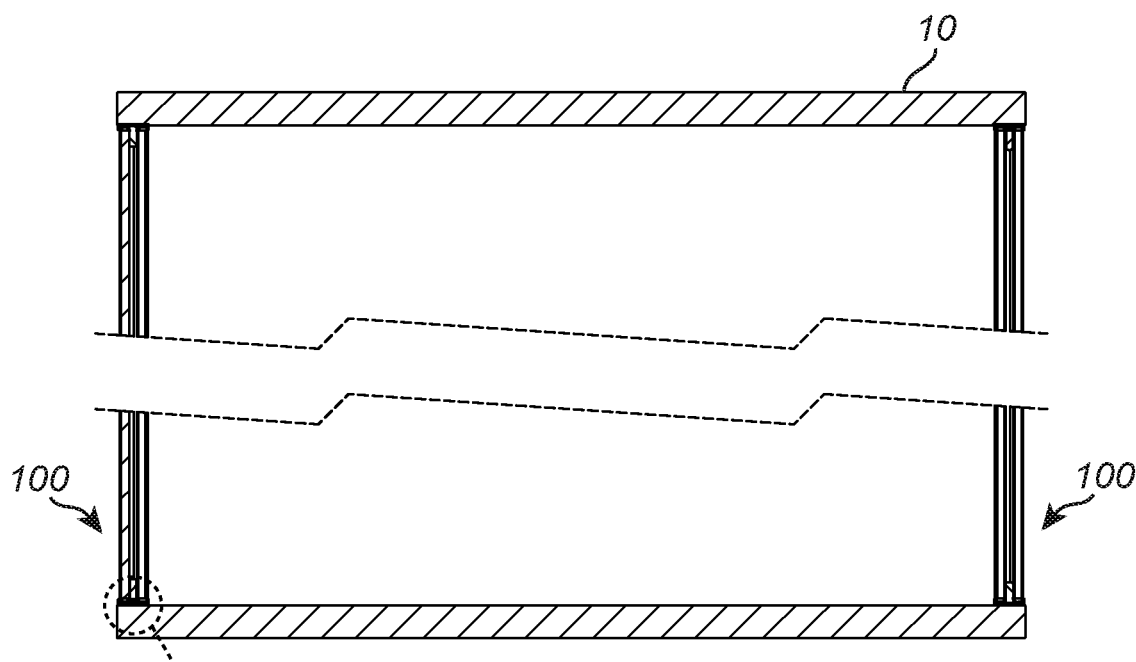
FIG. 3 is another cross-sectional view of the cabinet of FIG. 1.

In FIG. 3 the doors 12*a-b* are omitted, and it is clear that each rotary system 100 extends along the height of the cabinet 10 such that the respective doors 12*a-b* are fully supported along their entire height. However it is realized that the rotary system 100 may not necessarily be configured in this way; the rotary system 100 may in some embodiments be much shorter in height, while additional components are provided for ensuring the desired rigidity and stability of the doors 12*a-b*.

Figure 4:
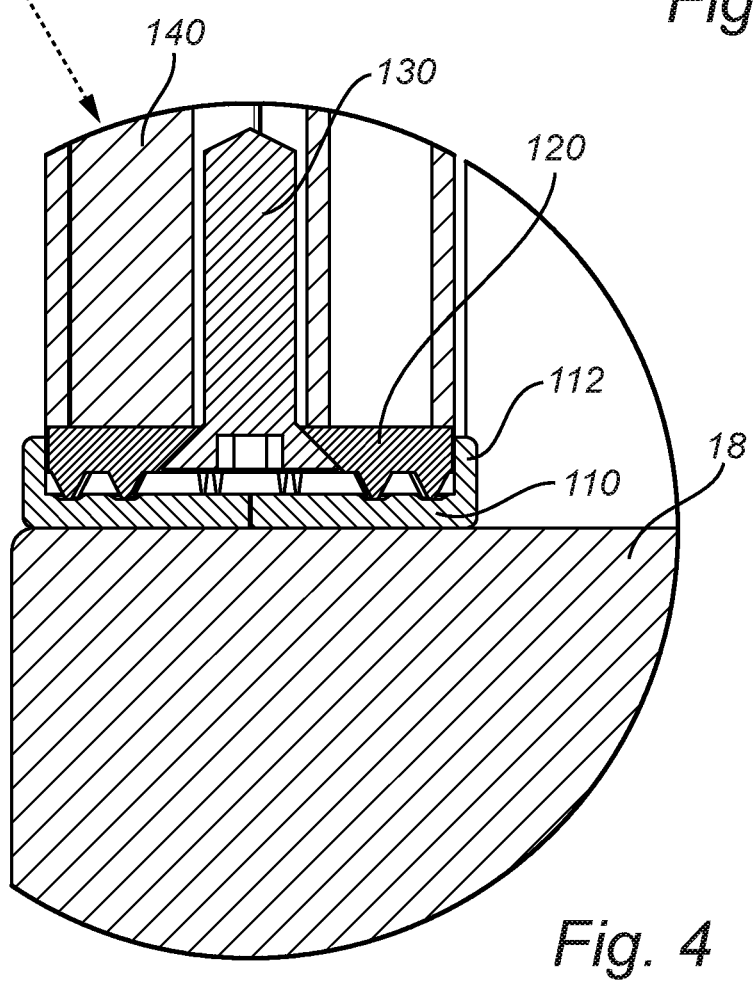
FIG. 4 is a cross-sectional view of a rotary system of the cabinet shown in FIGS. 1-3.

The rotary system 100 is shown in further details in FIG. 4. A stationary member in the form of a fixed circular member 110 is securely attached to the bottom 18 of the cabinet 10, e.g. by gluing or using other suitable attachment means, such as screws. The circular member 110 is provided with an axial extension 112 at its outer periphery in order to delimit any radial movement of a rotational member in the form of a rotating member 120. The rotating member 120 is also circular to fit inside the circular member 110. A screw 130 is used to secure the rotating member 120 to a cylinder 140 extending upwards along the height of the cabinet 10. The cylinder 140 is provided with some means for attaching a door leaf to it, thus forming the swinging door 12*a*, 12*b*. The attachment means may e.g. be a longitudinal slit extending along the cylinder 140 and accommodating one lateral end of the door leaf. At the upper end of the cylinder 140, it may fit within a cylindrical member (not shown) fixed to the upper part of the cabinet 10. The cylinder 140 may thus be allowed to turn within the cylindrical member 110. During operation, when the door 12*a-b* is swung relative to the cabinet 10, the cylinder 140 and hence the rotating member 120 will turn relative the circular member 110.

Figure 5:
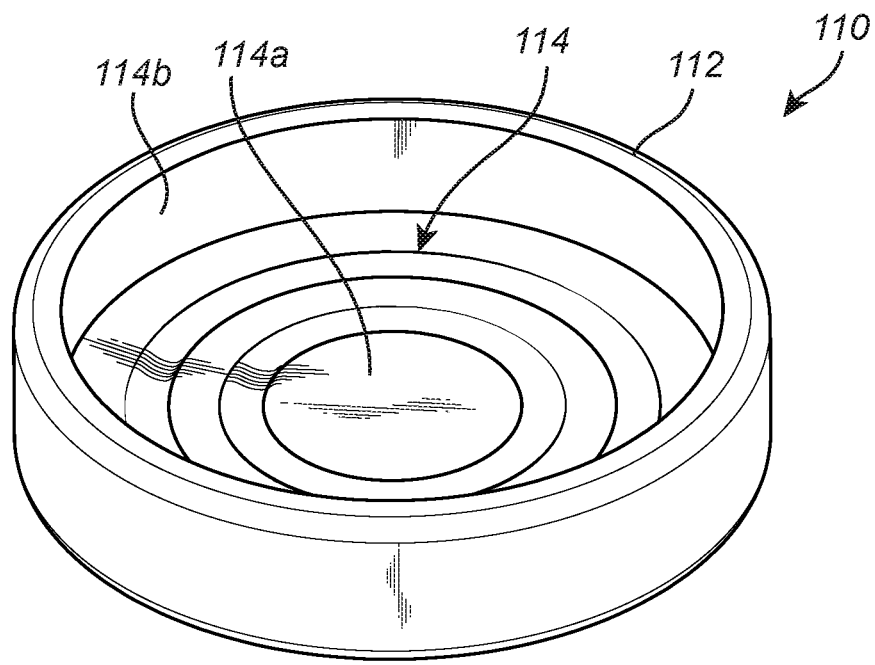
FIG. 5 is an isometric view of one member of the rotary system shown in FIG. 4.

Smooth turning of the door 12*a-b* is ensured due to the sliding interface between the circular member 110 and the rotating member 120. In FIG. 5 the circular member 110 is shown. An inner surface 114 of the circular member 110 may be divided into a substantially horizontal surface 114*a* and a substantially vertical surface 114*b*, wherein the vertical surface 114*b* is formed on the inner side of the axial extension 112. As will be described further with reference to FIG. 8 the inner surface 114 is provided with superior low friction properties, thus forming a sliding surface.

Figure 6:
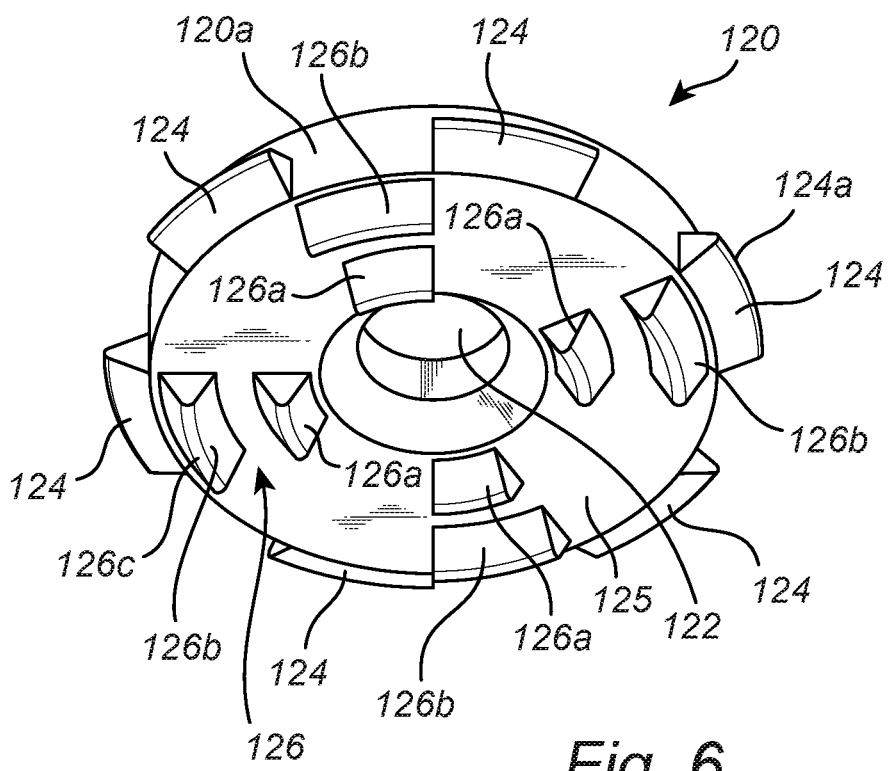
FIG. 6 is an isometric view of another member of the rotary system shown in FIG. 4.

In FIG. 6 details of the rotating member 120 are shown. The rotating member 120 has a central through hole 122 for receiving the screw 130. The through hole 122 is preferably tapered such that the head of the screw 130 does not protrude axially outside the rotating member 120 (see e.g. FIG. 4). As is further shown in FIG. 6 the rotating member 120 has a disc-like shape with a certain height such that horizontal blades 124 can be fitted onto the sidewall 120*a* of the rotating member 120. The horizontal blades 124 are distributed evenly around the periphery of the rotating member 120; in the shown example there is six horizontal blades 124. Each horizontal blade 124 extends radially out from the rotating member 120. The shape of each horizontal blade 124 is tapered, such that an apex 124*a* is formed at the free end of the blade 124. Further, each horizontal blade 124 is curved in the radial direction such that each blade 124 has a constant radius in the horizontal plane.

The bottom side 125 of the rotating member 120 is preferably planar and provided with vertical blades 126 extending downwards. In the shown example there are two sets of vertical blades 126*a-b*. A first set of vertical blades 126*a* are arranged along a first circular path, and a second set of vertical blades 126*b* are arranged along a second circular path. The first and second circular paths are preferably concentric.

Each set of vertical blades 126*a-b* comprises a plurality of blades 126 being evenly distributed along the respective circular path. In the shown example each set of blades 126*a-b* comprises four vertical blades 126 arranged at an angular distance of 90° from each other. The four separate blades 126 of the first set of vertical blades 126*a* will, during operation, be running along the same first circular path when the rotating member 120 is turned in the circular member 110, and the four separate blades 126 of the second set of vertical blades 126*b* will be running along the same second circular path, which is different from the first circular path of the first set of vertical blades 126*a*. Each separate blade 126 is relatively short, the length of the respective blade 126, as seen along the sliding direction of the rotating member 120, being 2-15 mm, more preferably 3-10 mm. The shape of each vertical blade 126 is tapered, such that an apex 126*c* is formed at the free end of the blade 126. Further, each vertical blade 126 is curved in the radial direction such that the apex 126*c* of a single blade 126 is extending along a constant radius.

When mounted, the blades 124, 126 of the rotating member 120 will form a sliding interface with the sliding surface 114 of the circular member 110. The engagement between the blades 124, 126 and the sliding surface 114 is further shown in FIG. 7. In particular, the horizontal blades 124 will slide against the vertical surface 114*b* of the circular member 110, while the vertical blades 126 will slide against the horizontal surface 114*a* of the circular member 110. While the vertical blades 126 will provide axial guidance of the rotating member 120 relative the circular member 110, the horizontal blades 124 will provide radial guidance of the rotating member 120 relative the circular member 110.

It should be noted that the furniture rotary system 100 would also work desirably without the provision of the horizontal blades 124, which thus are optional.

It was surprisingly found that decreasing the contact area at the interface between the circular member 110 and the rotating member 120 reduced the friction. Normally the risk for bearing seizing typically increases with reduced contact area.

The blades 124, 126 thus form contact areas with the sliding surface 114 of the circular member 110. According to an embodiment, the contact area of each individual contact point (i.e. the apex 124*a*, 126*c* of each blade 124, 126) is less than 3 $mm^2$, such as less than 1.5 $mm^2$, or less than 0.75 $mm^2$.

It has been found that the friction becomes lower when the contact pressure between the rotating member 120 and the circular member 110 is relatively high. The contact pressure is calculated by dividing the load carried by each individual contact point by the contact area of the contact point. In an example, in which a system of a somewhat similar type was tested for sliding doors the contact pressure was calculated. The sliding door had a total weight of 8.5 kg meaning a total load of 83.3 N. The sliding door was carried by two sliding members where each sliding member had four contact points, each such contact point having an area of 0.675 $mm^2$. The contact pressure was then: 83.3 N/(2×4×0.675 $mm^2$)=15.4 N/$mm^2$. Similar calculations may be performed for the present rotary system and similar high loads are suitable. Hence, preferably, the contact pressure in said at least one contact point is at least 4 N/$mm^2$, more preferably at least 8 N/$mm^2$, such as at least 12 N/$mm^2$. Preferably, the contact pressure is lower than the strain at yield (=yield strength) for the material from which the rotating member 120 is made.

In order to provide low friction, at least the part of the rotating member 120 in contact with the sliding surface 114 of the circular member 110 is preferably made of a plastic comprising a polymer, such as a polymer comprising polar groups. Examples of such polar groups include hydroxyl groups, carboxylic acid groups, amide groups, halide groups, sulfide groups, cyano groups (nitrile groups), carbamate groups, aldehyde groups, and/or ketone groups The polymer may preferably be selected from the group consisting of polyoxymethylenes (POM), polyesters (e.g. thermoplastic polyesters, such as polyethylene terephthalate (PET), polytrimethylene terephthalate (PTT), polybutylene terephthalate (PBT), and polylactic acid (PLA), as well as bio-based thermoplastic polyesters, such as polyhydroxyalkanoates (PHA), polyhydroxybutyrate (PHB), and polyethylene furanoate (PEF)), polyamides (PA), polyvinyl chloride (PVC), polyphenylene sulfide (PPS), polyaryletherketone (PAEK; e.g. Polyether ether ketone (PEEK)), and Polytetrafluoroethylene (PTFE). These polymers are particularly good at combining mechanical strength with a low friction in the present arrangements. Further, not only the part of the rotating member 120 in contact with the sliding surface 114 (i.e. the blades 124, 126) may be made of a polymer, but the entire rotating member 120. Thus, rotating member 120 may be made from a plastic comprising a polymer.

As recognized by the skilled person, the plastic may further comprise other additives, such as fillers, colorants, and/or plasticizers. Further, the rotating member 120 may be made from a composite comprising a polymer, such as one of the above listed polymers, optionally filled with particles and/or fibers. The particles and/or fibers will increase the hardness, the stiffness, the creep resistance and elongation (compression) at yield of the rotating member 120. While not affecting the friction, presence of particles and/or fibers may affect the wear. Thus, use of particles and/or fibers in the plastic is less preferred.

Figure 7:
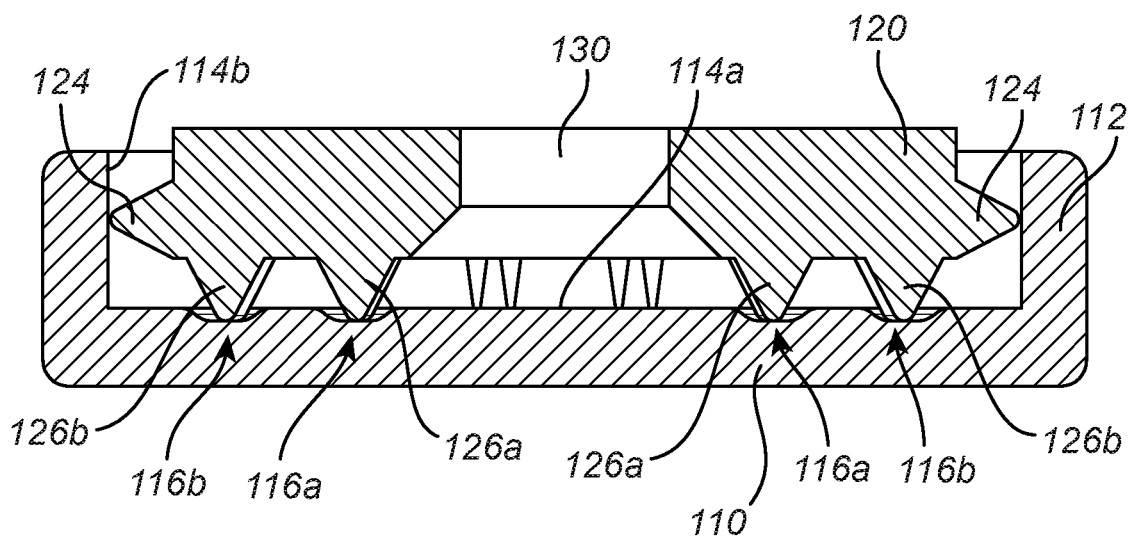
FIG. 7 is a cross-sectional view of the engagement between the two members of a rotary system shown in FIGS. 5 and 6.

As is further shown in FIG. 7 the horizontal sliding surface 114a of the circular member 110 may be provided with two circular depressions 116a-b arranged concentric, each at a constant radius corresponding to the radius of the circular path of the sets of vertical blades 126a-b. The vertical blades 126 will thereby fit with the respective depression 116a-b. The depressions 116a-b may support and guide the vertical blades 126 of the rotating member 120. Furthermore, the sliding surface 114b of the vertical sidewall 112 of the circular member 110 may also be provided with a depression for receiving and guiding the horizontal blades 124 of the rotating member 120.

In the described example each blade 124, 126 forms a protrusion having a limited length, i.e. a limited extension in the peripheral direction. For the horizontal blades 124 this means that each blade 124 forms a segment of the circular periphery of the rotating member 120. For the vertical blades 126 this means that each blade is semi-circular, i.e. it has a limited angular extension along its circular path. Each blade 124, 126 may in other embodiments extend along the entire circular path, such that the individual horizontal blades 124 are replaced by a single blade extending along the entire periphery of the rotating member 120, while the individual vertical blades 126 of the sets 126a-b are replaced by two blades extending along the entire respective circular path.

Each protrusion or blade 124, 126 preferably has a pyramidal shape in cross-section, i.e. the distal end of each protrusion 124, 126 forms an apex 124a, 126c. Hence each protrusion or blade 124, 126 will form only a very small contact area with the sliding surface 114 of the circular member 110. It should be understood that the exact configuration of the blades 124, 126 is to be determined based on specific application parameters, such as weight of the door 12a-b, diameter of the circular member 110, the desired force being required to swing the door 12-b, the material of the rotating member 120, the mechanical strength of the sliding surface 114, etc.

Figure 8:
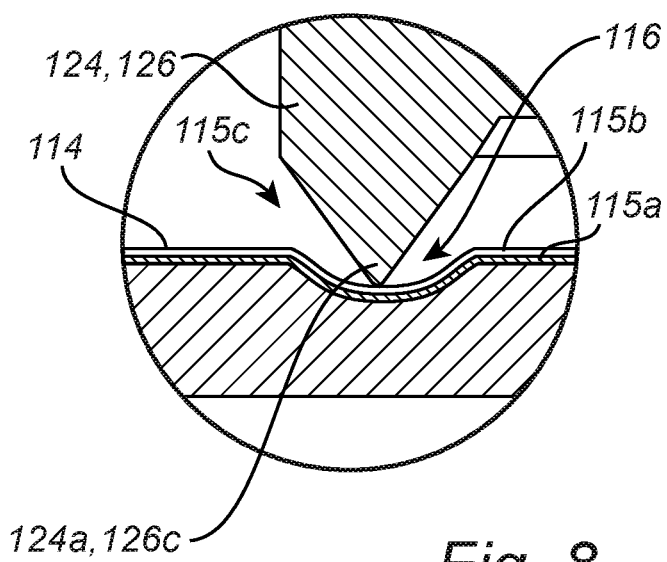
FIG. 8 is a cross-sectional view of a sliding engagement between two members of a rotary system.

FIG. 8, being an enlarged principle view of the contact between a blade 124, 126 and the sliding surface 114, illustrates how the sliding surface 114 is coated with a lacquer comprising a resin 115a. The lacquer comprising a resin 115a is in turn coated with a lipophilic composition coating 115b. Thereby a slide layer 115c is formed. The rotating member 120, carrying the blades 124, 126 may slide over this slide layer 115c at a very low friction. As can be seen in FIG. 8 the sliding surface 114 is provided with a concave depression 116 for receiving the blade 124, 126 of the rotating member 120, in accordance with the description above. Also, FIG. 8 clearly shows the relatively sharp apex or tip 124a, 126c of the blade 124, 126.

In order to provide the rotary system 100 with its respective sliding surface 114, the part or member 110 to form the sliding layer 114 is lacquered with a lacquer comprising a resin. Further, the lacquer is at least partly coated with a lipophilic composition to lower the sliding resistance, i.e. the friction. It has surprisingly been found that coating a surface lacquered with a resin, for example an acrylic resin, with a lipophilic composition, such as for example sebum (natural or artificial), coconut oil, or liquid paraffin, provides a slide layer 115c with extremely low friction (sliding resistance). The application of the lipophilic composition reduces the dynamic friction with as much as 75%. Further, and even more surprisingly, the effect is not temporarily, but seemingly permanent or at least long-lasting. The need to replenish the lubricant may hence be dispensed with.

In experiments employing aluminum profiles as the stationary member (thus corresponding to the circular member 110 of the example shown in FIGS. 1-7) having been anaphoretically coated with an acrylic resin subsequently heat cured to form a lacquer (cf. the Honny process, initially disclosed in GB 1,126,855), wherein the lacquer of the aluminum profiles was coated with sebum, the friction remained nearly the same after more than 70,000 test cycles of a sliding door being reciprocated along the profile. So many cycles by far exceed the expected number of lifetime cycles. Further, washing the coated aluminum profile with water/detergent, ethanol, and/or iso-propanol did not affect the friction. Without being bond to any theory, it seems that the sebum coating provides an irreversibly bound lubricant coating on top of the lacquer comprising the acrylic resin. Further, the lacquer seems to be important in providing low friction.

According to an embodiment there is thus provided a furniture rotary system stationary member 110, e.g. the circular member 110, having at least one sliding surface 114 coated with a lacquer comprising a resin. The lacquer is in turn at least partly coated with a lipophilic composition coating to provide a slide layer 115c with lowered friction. By coating the lacquer, the sliding friction is not just temporarily lowered, but long term low sliding friction is obtained. As already explained the lubricating coating may be permanent, dispensing with the need to replenish the lubricating coating. Further, very low amounts of the lipophilic composition are needed to provide lowered friction. Thus, contamination of the lubricating coating does not pose any pronounced problem, as the coating, due to the very low amount present, does not have substantial adhesive properties. This is in contrast to the normal use of lubricants in rotational bearings. Further, exposure to contaminations, e.g. dust etc., has been shown not to affect the lowered friction. Neither is the lubricating coating sensitive to washing. Wiping the sliding surface 114 with a dry and/or wet cloth, does not affect the lowered friction.

Such a low amount of the lipophilic composition coating is needed, that the lipophilic composition may be applied to a rotating member 120 rather than to the sliding surface 114. In sliding over the sliding surface 114, the lipophilic composition will be transferred to the sliding surface 114 to provide a lipophilic composition coating. Hence, the lipophilic composition coating could be applied to the sliding surface 114, to the rotating member 120, or both.

According to an alternative embodiment a rotating member 120 is a sliding part whose slide layer, having a similar composition as the slide layer 115c described hereinbefore, is arranged to slide and rotate relative a stationary member, e.g. a plastic member, to form a rotary system. At least the sliding surface of the sliding part may, according to one embodiment, be an aluminum surface, preferably having an anodized oxide surface layer, onto which the lacquer is applied. The thickness of anodized oxide surface layer is preferably at least 5 micrometers, more preferably at least 10 micrometers. Further, the thickness of the anodized layer may be less than 250 micrometers, such as less than 100 micrometers or less than 50 micrometers.

While the sliding surface 114 preferably is formed on an aluminum member with an aluminum oxide layer, also other materials coated with a lacquer comprising a resin may be considered. In order to allow for long term use and to carry loads, the sliding surface 114 is typically made from a hard material, such as metal or glass. Especially the surface of the slide member should preferably be hard. The Vickers hardness of the material from which the sliding surface 114 is made, may be at least 50 MPa, more preferably at least 100 MPa, still more preferably at least 150 MPa, and most preferably at least 300 MPa. According to an embodiment, the sliding surface 114 is formed on a metal piece, such as an aluminum piece or a steel piece. While it is preferred if an aluminum piece has an oxide layer, also a raw, i.e. not oxidized, lacquered aluminum piece may be used. It is however preferred if the surface of the aluminum piece is oxidized to provide the aluminum piece with a hard oxide surface layer.

The sliding surface 114 may be formed on an aluminum member. Further, the surface of the aluminum member coated with the lacquer may be an aluminum oxide layer. The thickness of such oxide layer may be at least 5 micrometers, more preferably at least 10 micrometers. Further, the thickness of the oxide layer may be less than 250 micrometers, such as less than 100 micrometers or less than 50 micrometers. As known in the art, the durability and hardness of the surface of aluminum pieces may be improved by oxidation due to the properties of aluminum oxide. The oxide layer initially provided by anodically oxidation is porous. While the pores may be closed by steam treatment, sealing via anaphoretically coating with an acrylic resin subsequently heat cured to form the lacquer, is even more effective in sealing the porous aluminum oxide layer: This method, firstly disclosed by Honny Chemicals Co. Ltd. (cf. GB 1,126,855), is often referred to as the Honny process.

Further, compared to a plastic sliding surface, a hard, stiff member, such as aluminum or steel member, may accept far more heavy loads and still provide low friction.

In addition, it has been found that a relatively high contact pressure in the contact between the sliding surface 114 and the rotating member 120 reduces the friction. For this reason as well it is beneficial to make the sliding surface 114 from a hard material, such as aluminum or steel, since such materials can accept higher contact pressures, thereby reducing friction. The low friction also at high contact pressure is an advantageous property for a furniture rotary system, as a piece of furniture may be of heavy weight.

According to an embodiment, the low friction sliding surface 114 is formed on an aluminum member. Preferably, the aluminum member is oxidized (e.g. anodized) in order to increase the hardness of the surface. The member is typically anaphoretically coated with an acrylic resin subsequently heat cured, thereby providing a lacquered sliding surface 114. Such aluminum members may be obtained via the Honny process (cf. above) or one of its derivatives. Typically, the Honny process is used to provide white, glossy members. However, neither the Honny process nor the present embodiments are limited to white members. The preferable feature is that the lacquer is suitable for being coated with the lipophilic composition coating.

As known in the art, various resins, e.g. thermosetting resins, may be used to lacquer aluminum members and also other members, i.e. to form a lacquer on aluminum members and other members. Further, thermo setting resins may also be used to lacquer other metal members, e.g. a member made of steel. The lacquer comprises a resin. As known to the skilled person, a lacquer is a hard, thin coating. The resin of the lacquer may for this application preferably comprise polar groups, such as hydroxyl groups, carboxylic acid groups, amide groups, cyano groups (nitrile groups), halide groups, sulfide groups, carbamate group, aldehyd groups, and/or ketone groups. Further the resin of the lacquer may be a thermosetting resin.

Examples of resins for lacquering metal comprise acrylic resins and polyurethane resins. According to an embodiment, the resin is an acrylic resin, such as an acrylate resin, an acrylamide resin, a methacrylate resin, or a methyl metachrylate resin, and mixtures thereof. According to another embodiment, the resin is a polyurethane resin. The acrylic resin may be a thermosetting resin.

According to another embodiment, the resin of the lacquer is selected from the group consisting of: acrylic resins, acrylate resins, acrylamide resins, methacrylate resins, methyl metachrylate resins, acrylonitrile resins, styrene-acrylonitril resins, acrylonitrile styrene acrylate resins, reaction products or a mechanical mixture of alkyd resin and water-soluble melamine resin, reaction products or a mechanical mixture of a vinyl-modified unsaturated alkyd resin and a water-soluble melamine resin, and polymers and mixtures of one or several of these resins.

Further, the thermosetting resin may the reaction product or a mechanical mixture of an alkyd resin and water-soluble melamine resin, or of a vinyl-modified unsaturated alkyd resin and a water-soluble melamine resin, the water-soluble melamine resin being obtained from hexamethylol melamine hexaalkylether. Vinyl modified unsaturated alkyd resins may be made by polymerization of a vinyl monomer with an alkyd resin composed of an unsaturated oil or fatty acid. As known to the skilled person, the term "vinyl monomer" relates to a monomer having a vinyl group (—CH=CH2) in the molecule, such as an acrylic ester, for example methyl acrylate and ethyl acrylate, a methacrylic ester, for example methyl methacrylate and hydroxyethyl methacrylate, an unsaturated, organic acid, for example acrylic acid and methacrylic acid, and styrene.

Processes for obtaining thermosetting acrylic resins are well-known to the skilled person. As an example, they may be obtained by heating and stirring a mixture consisting of organic solvents, such as methanol, ethylene glycol, monobutyl ether, and/or cyclohexanone, unsaturated organic acids, such as acrylic acid, methacrylic acid, and/or maleic anhydride, a cross-linking vinyl monomer (as defined above), such as methylol-acrylamide and/or methylol methacrylamide, a polymerizable vinyl monomer, such as styrene and/or acrylic acid ester, polymerization catalysts, such as benzoyl peroxides and/or lauroyl peroxides, and polymerization regulators, such as dodecyl mercaptan and/or carbon tetrachloride, to carry out polymerization, thereafter neutralizing the product with, for example, an aqueous solution of ammonia and/or triethylamine to make the resin soluble in water. Further, as known to the skilled person, thermosetting resins composed of alkyd resins and water-soluble melamine resin may be obtained from hexamethylol melamine hexaalkyl ether, may be obtained by mixing a water-soluble melamine resin at a temperature of from room temperature to 100° C. with an alkyd resin modified with a fatty acid, the alkyd resin having an acid value of from 10 to 80, and being obtained by heating a mixture consisting of (1) a saturated or unsaturated aliphatic acid, (2) ethylene glycol, glycerol, polyethylene glycol, other polyhydric alcohol or an epoxide, (3) adipic acid, sebacic acid, maleic anhydride or other polybasic acid or anhydride, and (4) a small quantity of cyclohexanone, toluene or other organic solvent. Thermosetting resins may also be obtained by mixing a water-soluble melamine resin and an alkyd resin from the ester exchange process, the resin being obtained by esterifying a mixture of dehydrated castor oil, an above-mentioned polyhydric alcohol and a small amount of an ester exchanging catalyst such as caustic potash, and thereafter esterifying also an above-mentioned polybasic acid or anhydride. As further known to the skilled person, thermosetting resins consisting of a modified acrylic resin and a water-soluble melamine resin, obtained from hexamethylol melamine hexaalkyl ether, may be obtained by polymerising by heating and stirring a mixture consisting of organic solvents, such as methanol, ethylene glycol, monobutyl ether and/or cyclohexanone, unsaturated acids, such as acrylic acid and/or methacrylic acid, a vinyl monomer (as hereinabove defined), such as styrene and/or acrylic acid ester, a cross-linking vinyl monomer, if necessary, such as methylol, is normally used. Good results may be obtained by using a concentration of resin of from 5 to 20% by weight and by regulating the voltage and the initial current density within a safe and economical range.

As known to the skilled person further resins for use in lacquering metal surfaces are known in the art. As an example, the resin of the lacquer may be selected from the group consisting of cationic epoxy electrocoat, epoxy and polyester resins, and polyester resins. Still further, lacquers adapted for autodeposition coating, such as Autophoretic™ coatings (e.g. Aquence™ Autophoretic® 866™ and BONDERITE® M-PP 930™, the latter being an epoxy-acrylic urethane) available from Henkel AG, DE, may also be used in lacquering surfaces comprising iron.

The sliding surface 114 may be lacquered by electrocoating involving dipping a metal member into a bath containing the lacquer and applying an electric field to deposit lacquer onto the metal member acting as one of the electrodes. Further, the lacquer may be provided in powder form or in liquid form. Both powder and liquid lacquers may be sprayed onto the sliding surface 114 to coat it. For powder lacquers, electro static coating may be used. For liquid lacquers a wet spray application or application in a bath may be used. Further, liquid lacquers in a bath may apart from electrocoating be applied by autodeposition.

In order to provide low friction, the thickness of the lacquer should be as even as possible. Thus it may be preferred to apply the lacquer by an electrocoating process, e.g. anaphoretic coating (cf. the Honny method) or cataphoretic coating, providing very even coatings. There are two types of electrocoating, i.e. anodic and cathodic electrocoating. Whereas the anodic process was the first to be developed commercially, the cathodic process is nowadays more widely used. In the anodic process, a negatively charged material is deposited on the positively charged component constituting the anode. In the cathodic process, positively charged material is deposited on the negatively charged component constituting the cathode. In the art, cathodic electrocoating is also known as cathodic dip painting (CDP), cathodic dip coating, cataphoretic coating, cataphoresis and cathodic electrodeposition. Further, the electrocoating process may also be referred to by the trade names of the bath material used. Examples include Cathoguard (BASF), Cor-Max (Du Pont), Powercron (PPG) and Freiotherm (PPG). Further, also electrostatically coating by powder lacquers or autodeposition in a bath provides even coatings and may thus be used.

In lacquering steel surfaces, autodeposition may be used. As recognized by the skilled person, one of the important steps in autodeposition is the coating bath itself, where water-based paint emulsion at low solids (usually around 4-8% by weight) is combined with two other products. A "starter" solution of acidified ferric ($Fe^{3+}$) fluoride initiates the coating reaction and an oxidizing product stabilizes the metal ions in the solution. The coating emulsion is stable in the presence of ferric ions, but unstable in the presence of ferrous ions ($Fe^{2+}$). Therefore, if ferrous ions are liberated from the metal substrate, localized paint deposition will occur on the surface. Immersion of a component made from ferrous metal (e.g. steel) into an autodeposition bath causes the acidic environment to liberate ferrous ions, thereby causing the coating emulsion to be deposited, forming a mono-layer of paint particles. Henkel Adhesive Technologies (US)//Henkel AG & Co. KGaA (Germany) provides coatings under the trademark BONDERITE® for use in autodeposition.

As the lacquer coated on the sliding surface 114 typically is more compressible than the material of the sliding surface 114 itself, and as a load carrying rotating member 120 will apply pressure on the lacquer in sliding over the sliding surface 114, the thickness of the lacquer preferably is to be kept thin to reduce compression of it. Compressing the lacquer may negatively affect the rotating resistance; especially at the start of the rotating sequence, i.e. when the rotating member 120 starts to turn relative to the sliding surface 114 from a previous state of being at rest. According to an embodiment, the thickness of the lacquer coated on the sliding surface 114 is thus 100 µm or less, preferably 75 µm or less, more preferably 50 µm or less. Further, the thickness of lacquer coated on the sliding surface 114 may be 5 to 75 µm, such as 10 to 50 µm, or 15 to 40 µm. Layers of these thicknesses have been found to provide for efficient rotating behavior, also at the instance when the rotating member 120 starts to turn relative to the sliding surface 114.

Not only the low dynamic friction provided by the present stationary member 110, but also the low difference between the static and dynamic friction provided by the present stationary member is beneficial in terms of the sliding behavior.

In order to reduce the friction of the sliding surface 114, the sliding surface 114 is, at least partly, coated with a lipophilic composition coating to provide a slide layer.

Further, while various components may be present in the lipophilic composition coating present on the lacquer, the composition typically comprises components with intermediate to long carbon chains, e.g. carbon chains having a carbon atom length of C6 or more, such as C8 or more. Thus, the lipophilic composition coating may comprise compounds comprising C6 to C40, such as C8 to C30 or even C10 to C24, non-aromatic hydrocarbyl groups. Typical examples of such non-aromatic hydrocarbyl groups are alkenyl groups and alkyl groups, e.g. alkyl groups. Examples of compounds comprising such non-aromatic hydrocarbyl groups are:

C6 to C40 non-aromatic hydrocarbons, such as alkenes and/or alkanes, e.g. alkanes;
tri-glycerides, e.g. triglycerides comprising C6 to C40, such as C8 to C30, non-aromatic hydrocarbyl groups; and
fatty acids, e.g. C6 to C40, such as C8 to C30, carboxylic acids, and esters thereof, such as alkyl esters of fatty acids, e.g. methyl esters.

As known to the skilled person and as recognized in IUPAC's gold book (International Union of Pure and Applied Chemistry, Compendium of Chemical Terminology—Gold Book, Version 2.3.3 of 2014 Feb. 24):

hydrocarbon denotes compounds consisting of carbon and hydrogen only;
hydrocarbyl denotes univalent groups formed by removing a hydrogen atom from a hydrocarbon;
alkane denotes acyclic branched or unbranched hydrocarbons having the general formula CnH2n+2;
alkene denotes acyclic branched or unbranched hydrocarbons having one or more carbon-carbon double bond(s);
alkyl denotes a univalent group derived from alkanes by removal of a hydrogen atom from any carbon atom —CnH2n+1;
alkenyl denotes an univalent group derived from alkenes by removal of a hydrogen atom from any carbon atom;
fatty acid denotes an aliphatic monocarboxylic acid;
triglyceride denotes an ester of glycerol (propane-1,2,3-triol) with three fatty acids (tri-O-acylglycerol); and
non-aromatic denotes a compound not comprising any cyclically conjugated molecular entity with increased stability due to delocalization.

According to an embodiment, the lipophilic composition coating present on the lacquer comprises at least 1 wt. % such as at least 5 wt. %, 10 wt. %, 25 wt. %, 50 wt. %, 60 wt. %, 70 wt. %, 75 wt. %, 80 wt. %, 85 wt. % or at least 90 wt. % of compounds comprising C6 to C40, such as C8 to C30, alkyl groups. Thus, the lipophilic composition coating may comprise least 1 wt. % such as at least 5 wt. %, 10 wt. %, 25 wt. %, 50 wt. %, 60 wt. %, 70 wt. %, 75 wt. %, 80 wt. %, 85 wt. % or at least 90 wt. % C6 to C40, such as C8 to C30, alkenes and/or alkanes, e.g. alkanes. Further, the lipophilic composition coating present on the lacquer may comprise least 1 wt. % such as at least 5 wt. %, 10 wt. %, 25 wt. %, 50 wt. %, 60 wt. %, 70 wt. %, 75 wt. %, 80 wt. %, 85 wt. % or at least 90 wt. % triglycerides and/or fatty acids (or alkyl esters thereof).

Whereas fatty acids have been found to improve the lubricating effect of mixtures of alkanes, such as liquid paraffin, they are less effective if used on their own. It is thus preferred if the lipophilic composition present on the lacquer is not only composed of fatty acids. The lipophilic composition present on the lacquer may thus comprise less than 99 wt. % fatty acids, such as less than 95 wt. % fatty acids. However, lipophilic compositions essentially only comprising triglycerides, such as coco nut oil, provide very low friction and do thus represent a preferred lipophilic composition present on the lacquer.

According to an embodiment, the lipophilic composition coating present on the lacquer comprises at least 1 wt. % such as at least 5 wt. %, 10 wt. %, 25 wt. %, 50 wt. %, 60 wt. %, 70 wt. %, 75 wt. %, 80 wt. %, 85 wt. % or at least 90 wt. % of alkenes and/or alkanes, e.g. alkanes and 0.1 to 50 wt. %, such as 1 to 40 wt. % or 5 to 30 wt. % triglycerides and/or fatty acids.

According to another embodiment, the lipophilic composition coating present on the lacquer comprises at least 1 wt. % such as at least 5 wt. %, 10 wt. %, 25 wt. %, 50 wt. %, 60 wt. %, 75 wt. %, 80 wt. % or at least 90 wt. % in total of triglycerides and/or fatty acids and 0.1 to 95 wt. %, such as 1 to 90 wt. % or 5 to 60 wt. % alkenes and/or alkanes, e.g. alkanes.

As already mentioned, typical examples of compounds comprising C8 to C40 non-aromatic hydrocarbyl groups are tri-glycerides and fatty acids. According to an embodiment, the lipophilic composition coating present on the lacquer comprises triglycerides and/or fatty acids. The lipophilic composition coating may thus comprise more than 25 wt. %, e.g. more than 50 wt. %, such as 50 to 100 wt. %, or 75 to 95 wt. %, in total of triglycerides and fatty acids. The triglycerides and/or fatty acids may either be used as the major component in the lipophilic composition coating or as additives.

If to be used as a major component, the lipophilic composition present on the lacquer coating may comprise more than 50 wt. %, such as 50 to 100 wt. %, or 75 to 95 wt. %, triglycerides, e.g. triglycerides to at least 90% wt. composed of a glycerol residue and 3 residues of caproic acid, caprylic acid, capric acid, lauric acid, myristic acid, palmitic acid, stearic acid, and/or arachidic acid, such as 3 residues of lauric acids, myristic acid, palmitic acid, and/or stearic acid. According to an embodiment, the lipophilic composition coating present on the lacquer comprises coconut oil, such as at least 25 wt. % such as at least 50 wt. %, 60 wt. %, 70 wt. %, 75 wt. %, 80 wt. %, 85 wt. % or at least 90 wt. % coconut oil. Coconut oil comprises triglycerides composed of fatty acids that are to a high degree saturated fatty acids. The coconut oil may be hydrogenated to various degrees to further reduce the amount of unsaturated fatty acids residues. Further, the lipophilic composition coating present on the lacquer may comprise more than 50 wt. %, such as 50 to 100 wt. %, or 75 to 95 wt. % fatty acids, e.g. caproic acid, caprylic acid, capric acid, lauric acid, myristic acid, palmitic acid, stearic acid, and/or arachidic acid, such as lauric acids, myristic acid, palmitic acid, and/or stearic acid. Furthermore, the lipophilic composition coating present on the lacquer may comprise more than 50 wt. %, such as 50 to 100 wt. %, or 75 to 95 wt. % alkyl esters of fatty acids, e.g. methyl or ethyl esters. The esterfied fatty acids may be caproic acid, caprylic acid, capric acid, lauric acid, myristic acid, palmitic acid, stearic acid, and/or arachidic acid, such as myristic acid, palmitic acid, and/or stearic acid.

If to be used as an additive, the lipophilic composition coating present on the lacquer may comprise 0.1 to 50 wt. %, such as 1 to 30 wt. % or 5 to 15 wt. %, triglycerides, e.g. triglycerides to at least 90% composed of a glycerol residue and 3 residues of caproic acid, caprylic acid, capric acid, lauric acid, myristic acid, palmitic acid, stearic acid, and/or arachidic acid, such as 3 residues of lauric acids, myristic acid, palmitic acid, and/or stearic acid. A preferred example of composition to be used to provide a lipohilic composition coating comprising triglycerides is coconut oil. According to an embodiment, the lipophilic composition coating present on the lacquer comprises coconut oil, such as 0.1 to 50 wt. %, such as 1 to 30 wt. % or 5 to 15 wt. %, coconut oil. According to an embodiment, the lipophilic composition coating 141b present on the lacquer comprises at least 50 wt. % coconut oil, such as at least 60 wt. %, 70 wt. %, 75 wt. %, 80 wt. %, 85 wt. %, or 90 wt. % coconut oil. Coconut oil comprises triglycerides composed of fatty acids that are to a high degree saturated fatty acids. The coconut oil may be hydrogenated to various degrees to further reduce the amount of unsaturated fatty acids residues. Further, the lipophilic composition present on the lacquer may comprise 0.1 to 50 wt. %, such as 1 to 30 wt. % or 5 to 15 wt. %, of fatty acids, e.g. caproic acid, caprylic acid, capric acid, lauric acid, myristic acid, palmitic acid, stearic acid, and/or arachidic acid, such as lauric acid, myristic acid, palmitic acid, and/or stearic acid. Furthermore, the lipophilic composition coating present on the lacquer may comprise 0.1 to 50 wt. %, such as 1 to 30 wt. % or 5 to 15 wt. %, of alkyl esters of fatty acids, e.g. methyl or ethyl esters. The esterfied fatty acids may be caproic acid, caprylic acid, capric acid, lauric acid, myristic acid, palmitic acid, stearic acid, and/or arachidic acid, such as myristic acid, palmitic acid, and/or stearic acid.

Both saturated and un-saturated compounds comprising C6 to C40 non-aromatic hydrocarbyl groups are well-known in the art. While both types of compounds will be efficient in reducing the sliding resistance, saturated compounds comprising C6 to C40 non-aromatic hydrocarbyl groups are deemed to be less sensitive to oxidative degradation. Thus, it may be preferred to use compounds comprising C6 to C40 non-aromatic hydrocarbyl groups being triglycerides composed of saturated fatty acids residues and/or saturated fatty acids in the composition. It may however not be necessary to use 100% saturated fatty acids and/or triglycerides. As example, coconut oil is envisaged to have sufficient long term stability, though saturated fatty acids and/or triglycerides are preferred in terms of their long term stability.

As mentioned, the lipophilic composition coating present on the lacquer may comprises at least 1 wt. % C6 to C40 alkanes. As an example, the lipophilic composition coating present on the lacquer may thus comprise mineral oil, such as at least 1 wt. %, such as at least 5 wt. %, 10 wt. %, 25 wt. %, 50 wt. %, 60 wt. %, 70 wt. %, 75 wt. %, 80 wt. %, 85 wt. % or at least 90 wt. % mineral oil. Mineral oil is a colorless, odorless, light mixture of higher alkanes from a non-vegetable (mineral) source. Further, the lipophilic composition present on the lacquer coating may comprise liquid paraffin, such as at least 1 wt. %, such as at least 5 wt. %, 10 wt. %, 25 wt. %, 50 wt. %, 60 wt. %, 70 wt. %, 75 wt. %, 80 wt. %, 85 wt. % or at least 90 wt. % liquid paraffin. Liquid paraffin, also known as paraffinum liquidum, is a very highly refined mineral oil used in cosmetics and for medical purposes. A preferred form is the one having CAS number 8012-95-1. Furthermore, the lipophilic composition coating present on the lacquer may comprise petroleum jelly (also known as petrolatum, white petrolatum, soft paraffin or multi-hydrocarbon), such as at least 1 wt. %, such as at least 5 wt. %, 10 wt. %, 25 wt. %, 50 wt. %, 60 wt. %, 70 wt. %, 75 wt. %, 80 wt. %, 85 wt. % or at least 90 wt. % petroleum jelly. Petroleum jelly is a semi-solid mixture of hydrocarbons (with carbon numbers mainly higher than 25). A preferred form is the one having CAS number 8009-03-8.

The various examples mentioned above with respect to the configuration of the rotating member 120 as well as of the stationary circular member 110 being provided with the sliding surface 114 are not only valid for the embodiment described with reference to FIGS. 1-7, and the principle described in FIG. 8, but also to all embodiments of rotary systems described in the following.

Figure 9:
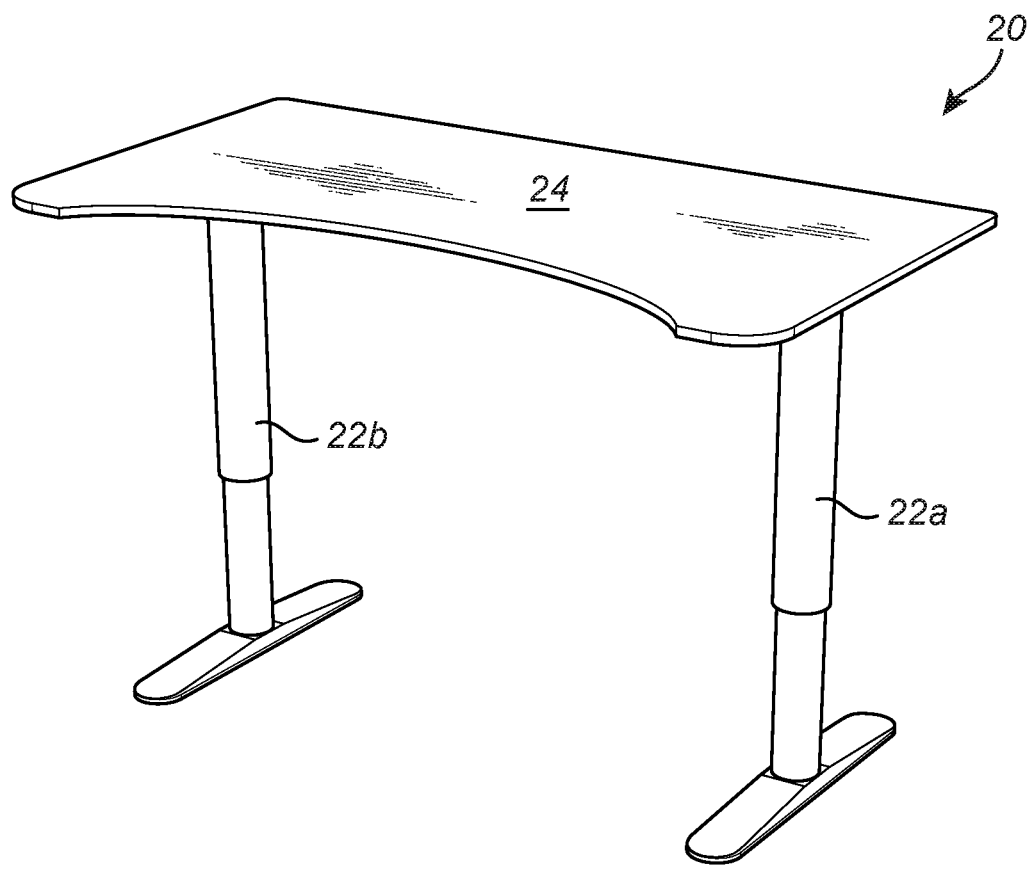
FIG. 9 is an isometric view of a sit to stand table.

In FIG. 9 a piece of furniture in the form of a table 20 is shown. The table 20 is a sit to stand table 20, i.e. a table 20 having legs 22a-b being adjustable in height direction. The legs 22a-b support a table top 24 which, upon adjustment of the height of the legs 22a-b, will move upwards or downwards in order to allow for a user to use the table top 24 either sitting or standing. Preferably, the adjustment of the legs 22a-b is synchronized such that the table top 24 remains in a horizontal position during adjustment.

Figure 10:
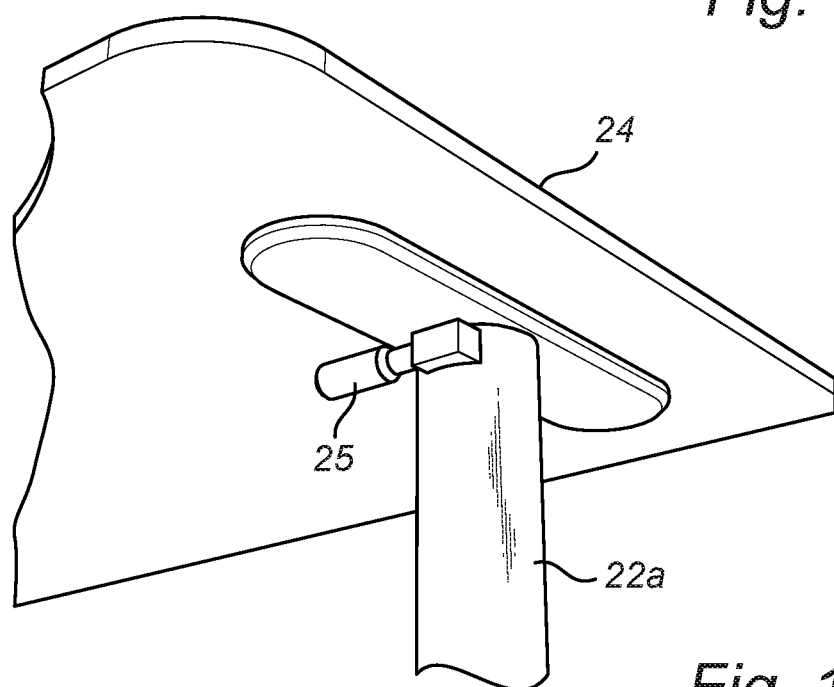
FIG. 10 is an isometric view of parts of the underside of the sit to stand table shown in FIG. 9.

As can be seen in FIG. 10 the legs 22a-b are attached at the underside of the table top 24, and each leg 22a-b is connected to an electrical motor 25 for controlling the height adjustment of the respective leg 22a-b.

Figure 11:
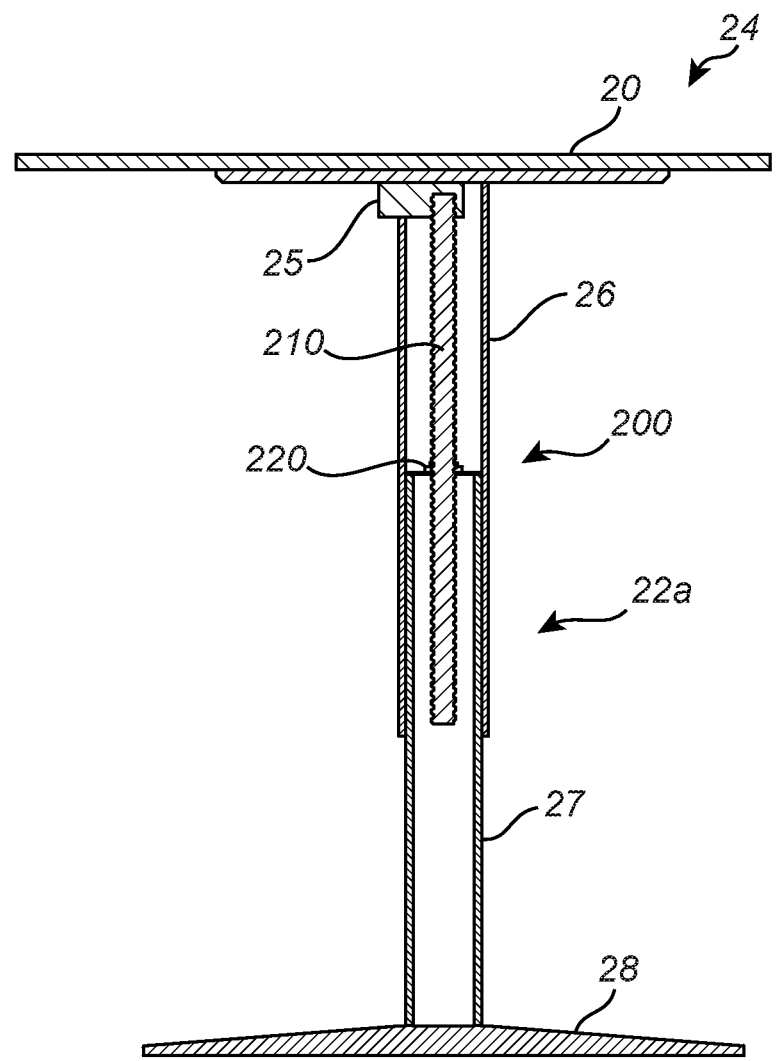
FIG. 11 is a cross-sectional view of one of the legs of the sit to stand table shown in FIG. 9.

In FIG. 11 further details of a leg 22a, and its associated furniture rotary system 200, are shown. The leg 22a comprises an upper sleeve-like member 26 attached to the underside of the table top 24. The sleeve-like member 26 extends downwards and at its lower end a cylinder 27 is inserted. The cylinder 27 is not rigidly attached to the sleeve-like member 26. The lower end of the cylinder 27 rests on the floor or ground, e.g. via a foot 28.

The furniture rotary system 200 comprises a rotational member in the form of a threaded rod 210 and a stationary member in the form of a stationary nut 220. The threaded rod 210 is at its upper end drivingly connected to the electrical motor 25, which upon actuation drives the threaded rod 210 to make it rotate. Preferably, the threaded rod 210 has a fixed axial position also during rotation. For this, the threaded rod 210 may be axially fixated at the underside of the table top 24. Driving of the threaded rod 210 may be accomplished in various ways. In the example shown in FIG. 11 the rotational shaft of the electrical motor 25 is arranged perpendicular to the longitudinal direction of the threaded rod 210 and a worm gear (not shown) may form the connection between the electrical motor 25 and the threaded rod 210. Reduction gears may also be provided in the drive connection between the electrical motor 25 and the threaded rod 210.

The threaded rod 210 extends from the upper end of the leg 22a and downwards, inside the sleeve-like member 26.

The stationary nut 220 is provided in a fixed manner at the upper end of the cylinder 27, and the nut 220 is configured to receive the threaded rod 210.

Figure 12:
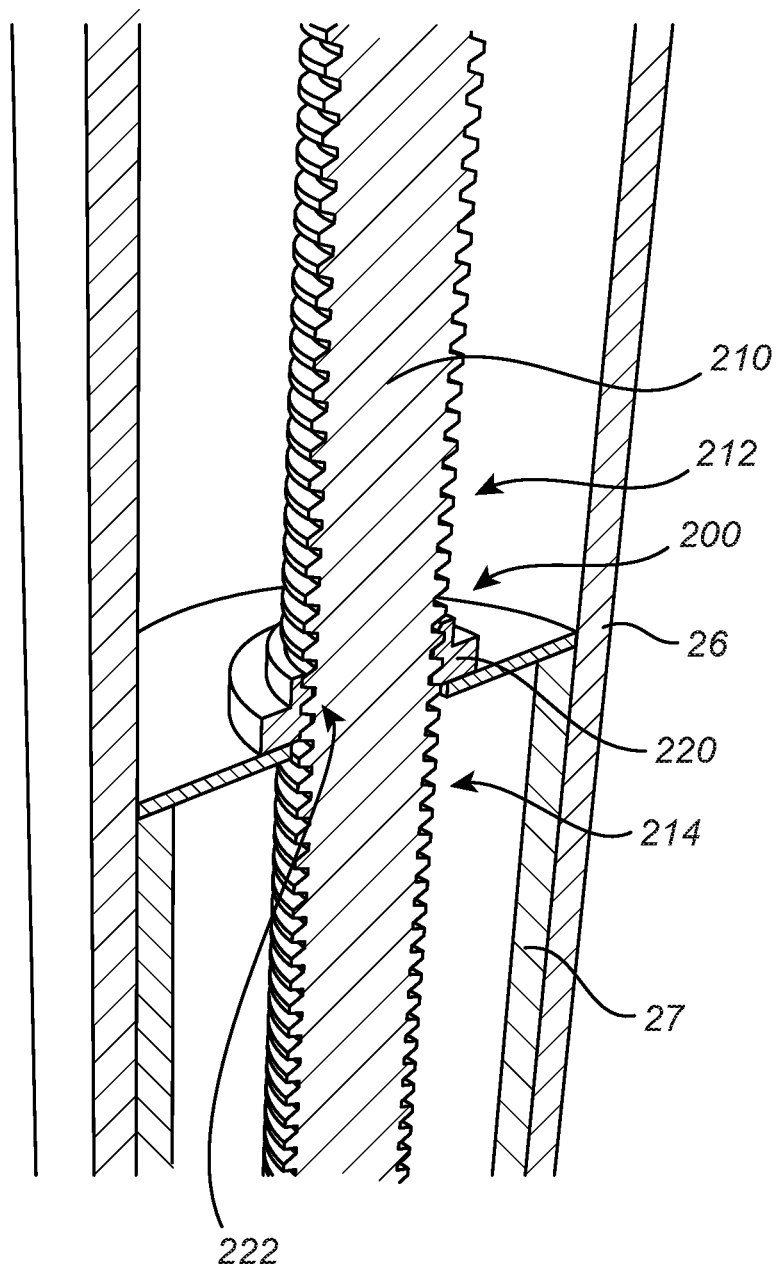
FIG. 12 is a cross-sectional view of a rotary system arranged inside the leg shown in FIG. 11.

Further details of the furniture rotary system 200 are shown in FIG. 12. The rod 210 is provided with external threads 212. The threads 212 may not necessarily be distributed along the entire length of the rod 210, but only along an axial portion to cover the maximum and minimum height adjustability of the leg 22a, as well as any intermediate positions. The outer surface of the threads 212 is provided with a sliding surface 214 in a similar manner as described with reference to FIGS. 1-8.

The nut 220 is provided with internal threads 222 configured to engage with the external threads 212 of the threaded rod 210.

Figure 13:
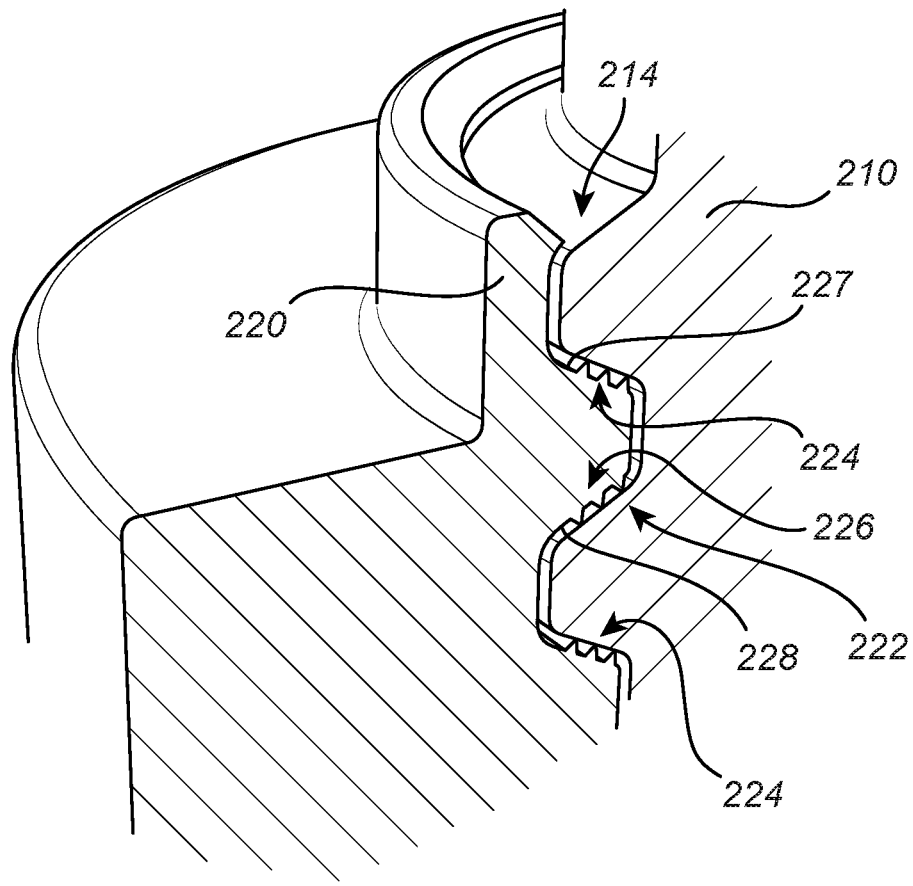
FIG. 13 is a cross-sectional view of engagement between two members of the rotary system shown in FIG. 12.

As is shown in further details in FIG. 13, the internal threads 222 of the nut 220 are provided with upper 224 and lower 226 blades or protrusions. The internal threads 222 of the nut 220 form an upper surface 227 facing upwards, and a lower surface 228 facing downwards. Both surfaces 227, 228 extend helically upwards. In the shown example the surfaces 227, 228 are substantially planar, but other curved configurations would also be possible as long as the blades 224, 226 engages with the sliding surfaces 214 of the threaded rod 210.

The upper surface 227 is provided with at least one blade 224 extending along the surface 227 in the helical manner. The lower surface 228 is also provided with at least one blade 226 extending along the surface 228 in the helical manner. In the shown example each surface 227, 228 is provided with three parallel blades 224, 226. Each blade 224, 226 is configured similar to the blades 124, 126 previously described. The blades 224, 226 may not necessarily extend continuously, but they may be truncated along the helical extension such that each blade 224, 226 rather comprises a series of consecutive blades, all distributed along the same helical extension. Although not visible in FIG. 13, the upper and lower blades 224, 226 may, hence, be divided into a plurality of individual and relatively short blades, according to similar principles as illustrated in FIG. 6 for the blades 126. Preferably, each separate blade 224, 226, of such series of consecutive blades, may have a length, as seen along the circular path, of 2-70 mm, preferably 3-50 mm, or even 2-15 mm, still more preferably 3-10 mm. The exact number of blades 224, 226 could be determined based on dimensions of the entire rotary system 200.

During height adjustment of the leg 22a the threaded nut 220 remains fixed. Independently of the current height of the leg 22a the blades 224, 226 are in sliding contact with the sliding surface 214 of the threaded rod 210. When the electrical motor 25 is activated the rod 210 starts to rotate, whereby the threaded rod 210 is also urged to move in the axial direction. Throughout rotation of the threaded rod 210 the sliding interface, formed by the contact between the blades 224, 226 and the sliding surface 214, will provide very low friction.

The choice of material for the threaded rod 210 and the nut 220 may be selected based on the examples described above with reference to FIGS. 1-8. Hence, the rod 210 is preferably a metal rod being treated to have a sliding surface 214 including a coating with a lacquer comprising a resin, and the lacquer in turn being coated with a lipophilic composition. The nut 220 may be of a plastic material comprising a polymer.

Figure 14:
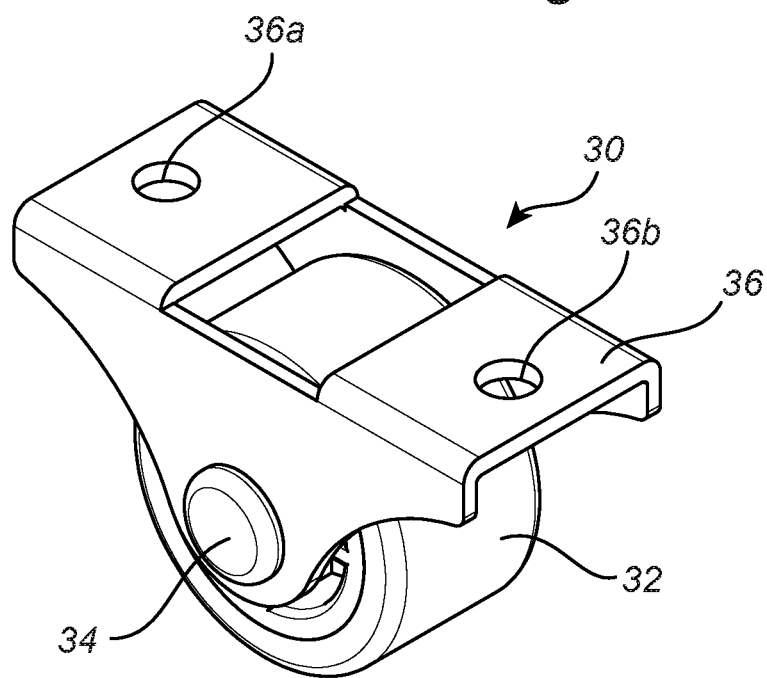
FIG. 14 is an isometric view of a wheel arrangement.

In FIG. 14 another example of a furniture rotary component in the form of a wheel arrangement 30 for use with a piece of furniture is shown. As will be explained in the following the wheel arrangement 30 comprises a rotary system 300 (see FIG. 16).

The wheel arrangement 30 comprises a wheel member 32 which is allowed to rotate around a shaft 34. The shaft 34 is supported by means of a furniture mounting part in the form of a bracket 36 which may be provided with screw holes 36a-b for attaching the wheel arrangement 30 to an associated piece of furniture such as a table, a shelf unit, a storage box, etc.

Figure 15:
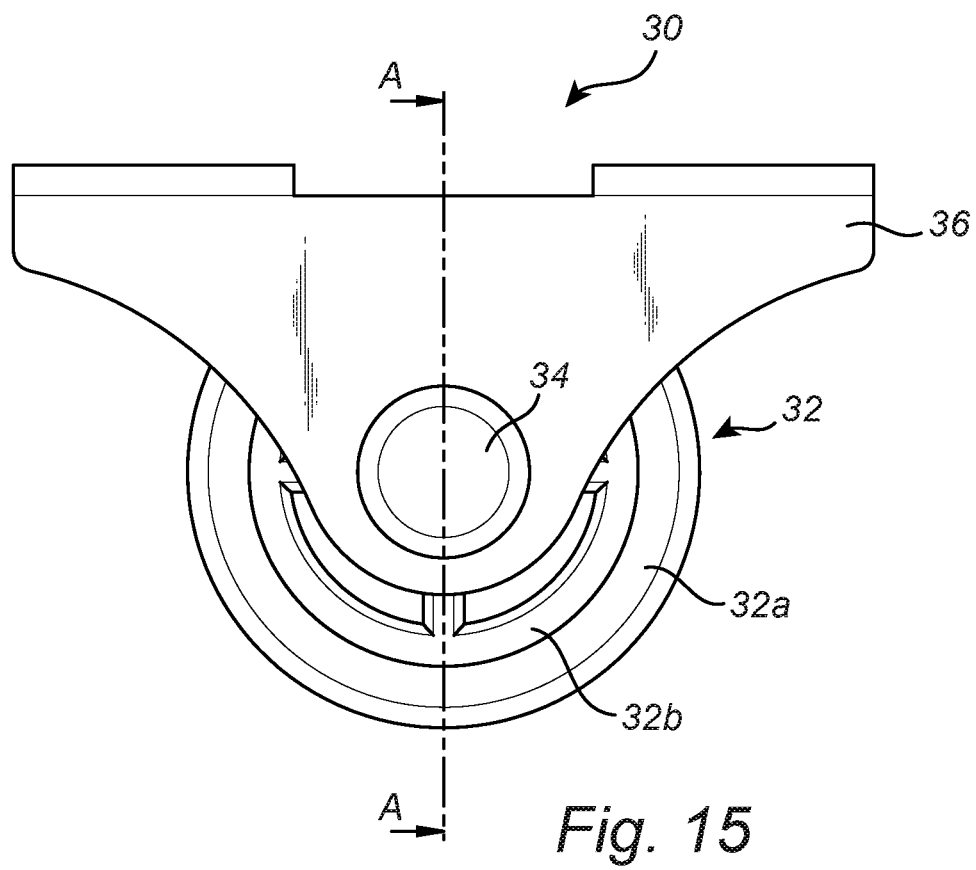
FIG. 15 is a side view of the wheel arrangement shown in FIG. 14.

In FIG. 15 the wheel member 32 is shown to have a circular outer surface 32a and a hub 32b. The outer surface 32a may e.g. be made of rubber or similar material to allow the wheel member 32 to move with little sound and vibration over a floor, etc. The hub 32b forms a rigid connection to the shaft 34.

Figure 16:
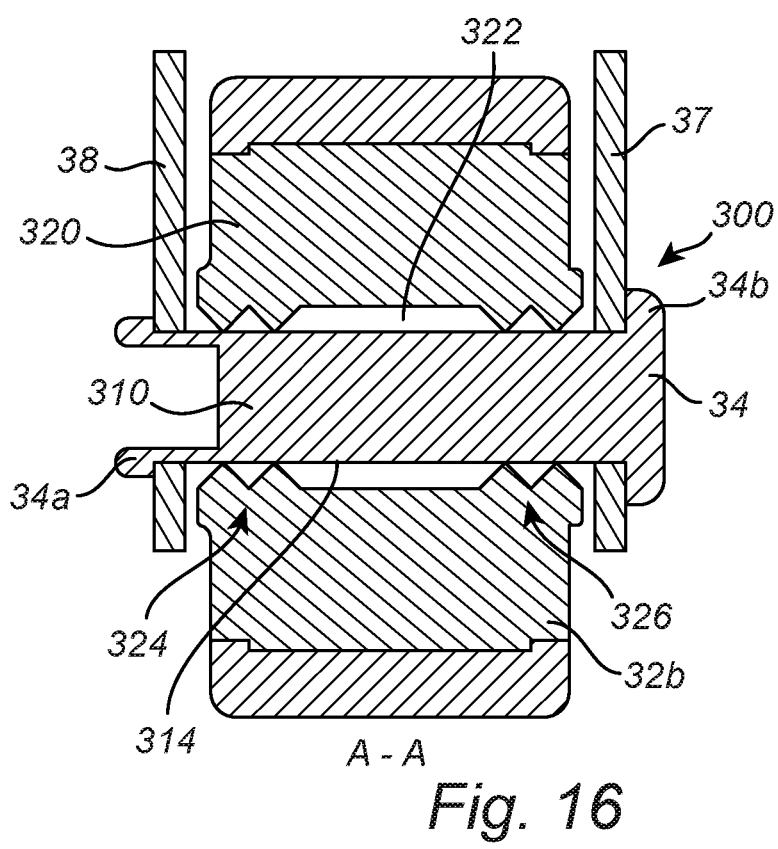
FIG. 16 is a cross-sectional view of the wheel arrangement shown in FIGS. 14 and 15, further showing a rotary system.

The wheel arrangement 30 is shown in cross-section in FIG. 16. The bracket 36 comprises two parallel side pieces 37, 38. Each side piece 37, 38 is provided with a through hole for receiving the shaft 34. The shaft 34 is provided with one flexible end 34a, which may function according to a snap-action principle, and the opposite end is provided with a head 34b for preventing the shaft 34 to pass through the holes. Hence, the flexible end 34a of the shaft 34 can be inserted into the hole of the first side piece 37, through the hub 32b of the wheel member 32 and through the hole of the second side piece 38. Upon this the flexible end 34a will flex outwards to snap lock the shaft 34, and consequently also the wheel member 32, to the bracket 36.

The shaft 34 and the hub 32b form a furniture rotary system 300. In particular, the shaft 34 forms a stationary member 310 while the hub 32b forms a rotational member in the form of a rotating member 320. The stationary member 310 has a cylindrical outer surface forming a sliding surface 314. The entire shaft 34 may e.g. be made of metal, and the sliding surface 314 may be provided in the same manner as described above, hence including a coating with a lacquer comprising a resin, and the lacquer in turn being coated with a lipophilic composition.

The rotating member 320, i.e. the hub 32b, has a cylindrical bore 322 wherein the diameter of the bore 322 is slightly larger than the diameter of the stationary member 310. Hence, the cylindrical bore 322 may be provided with blades or protrusions 324, 326 engaging with the sliding surface 314.

One lateral end of the cylindrical bore 322 is provided with blades 324, while the opposite lateral end of the cylindrical bore is provided with blades 326. As can be seen in FIG. 16 each lateral end is provided with two parallel blades 324, 326; however this number may of course be varied. The rotating member 320, or at least the blades 324, 326, may be made of a plastic material comprising a polymer as described above.

For further improving the lateral alignment of the wheel member 32 relative the shaft 34 the stationary member 310 may be provided with circular depressions (not shown) similar to the depressions 116 described with reference to FIG. 7.

Figure 17A:
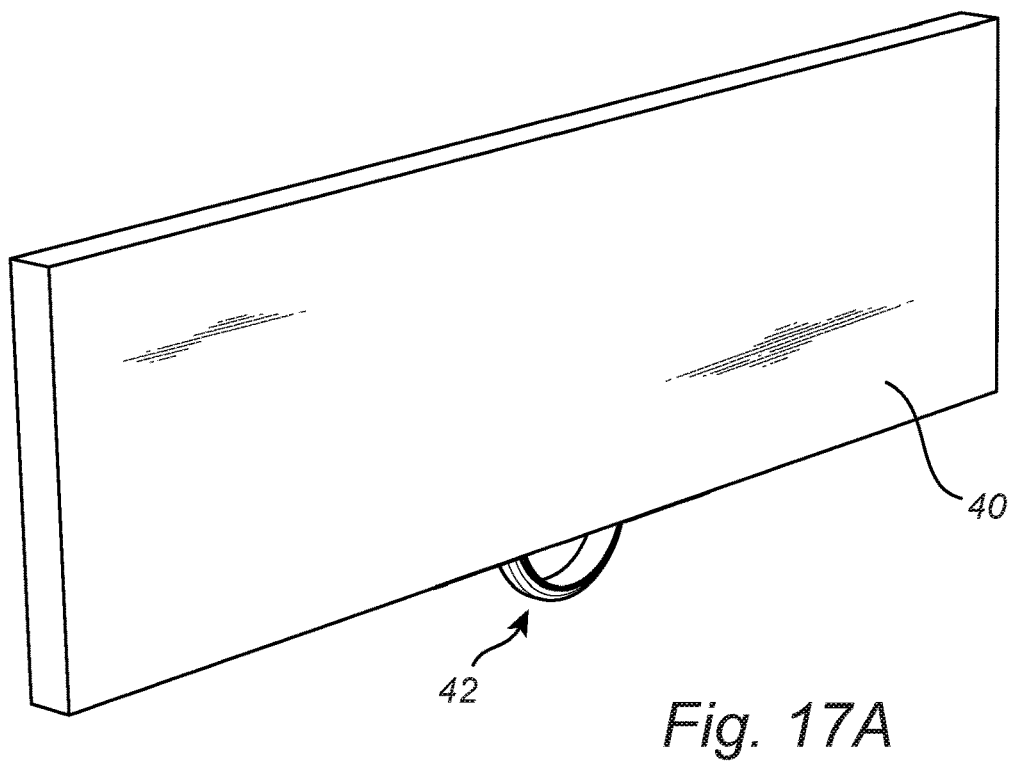
FIGS. 17*a-c* are isometric views of a wheel-supported piece of furniture according to different embodiments.
Figure 17B:
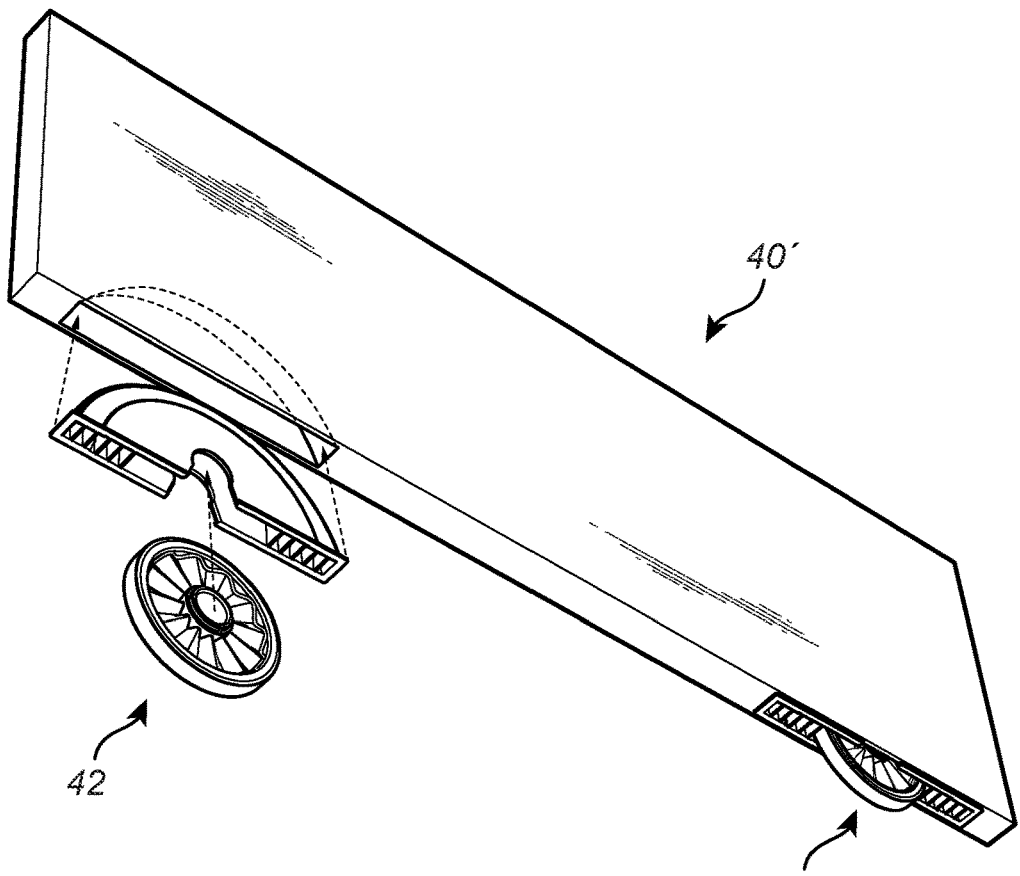
Figure 17C:
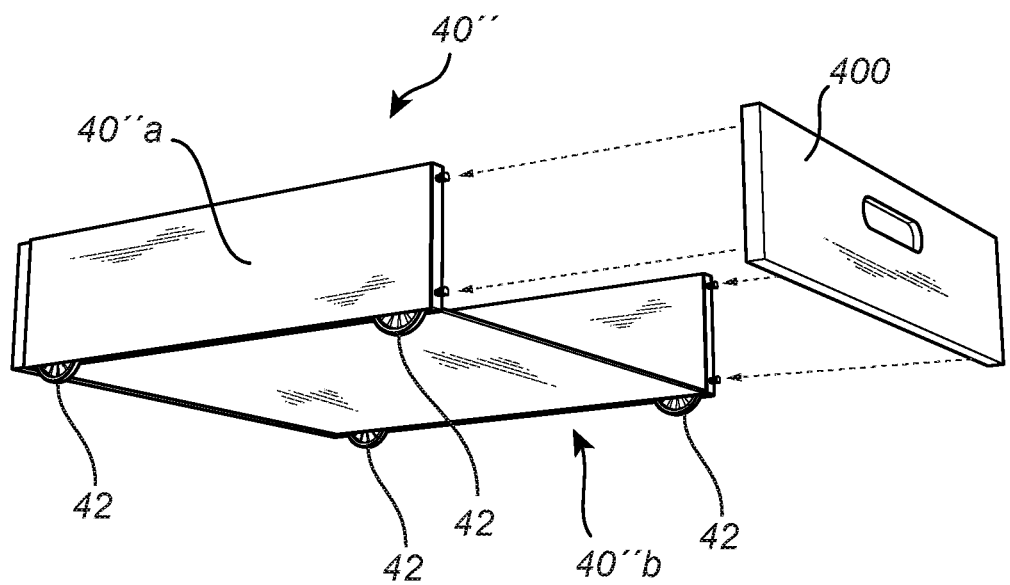

In FIG. 17a-c other examples of a piece of furniture 40, 40', 40" are shown. In FIG. 17a a furniture panel 40 is shown being provided with a wheel arrangement 42 embedded in the panel 40. In FIG. 17b a furniture panel 40' is shown being provided with two wheel arrangements 42 embedded in the panel 40'. In FIG. 17c a drawer 40" is shown being provided with two wheel arrangements 42 embedded in each side piece 40"a, 40"b of the drawer 40".

Figure 18:
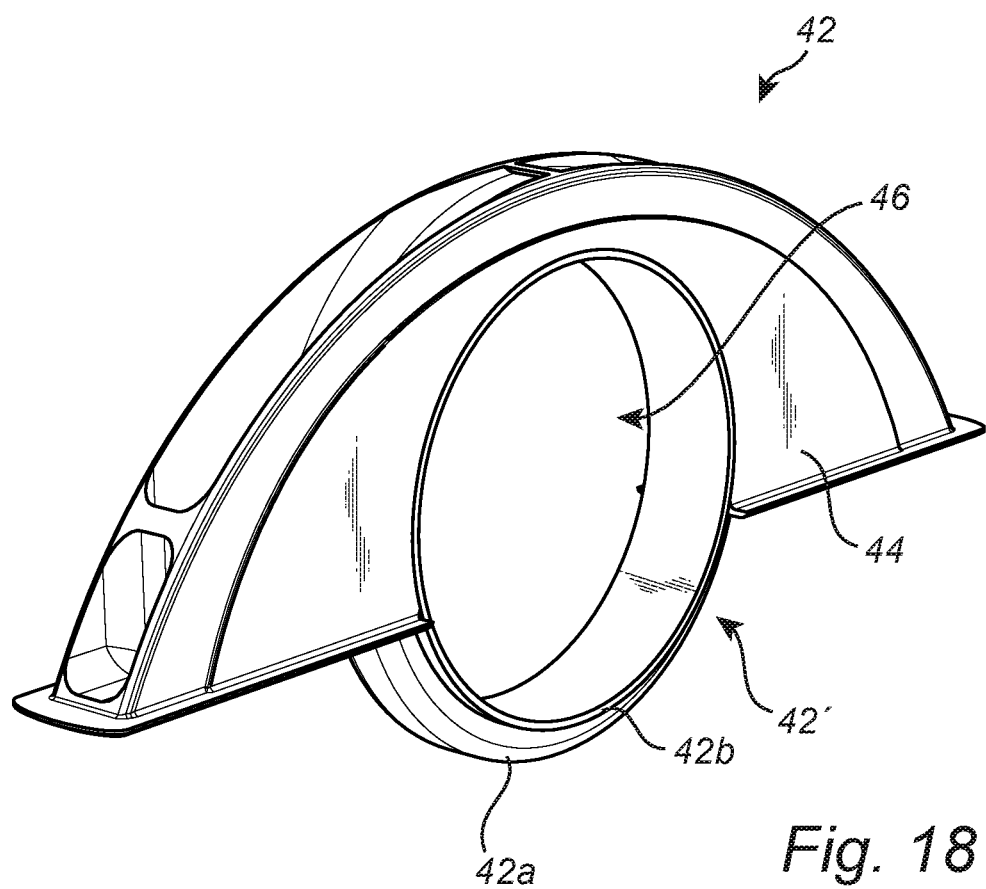
FIG. 18 is an isometric view of the wheel arrangement shown in FIGS. 17*a-c*.

The wheel arrangement 42 is further shown in FIG. 18. The wheel arrangement 42 includes a wheel member 42' comprising an outer surface 42a arranged onto a rim 42b, and a furniture mounting part in the form of a support member 44, wherein the wheel member 42' is inserted in and held by the support member 44. The outer surface 42a may be made of a rubber-like material, and the rim 42b may be made of metal. The support member 44 is configured to be inserted in a piece of furniture 40, 40', 40". The support member 44 has a semi-circular cutout 46 for receiving the rim 42b. The cutout 46 has an angular extension of more than 180°, such that the rim 42b is permanently received within the cutout 46 and may rotate therein without falling out of the support member 44, the rim 42b hence having the function of being a shaft of the wheel member 42'. The rim 42b and the support member 44 form a furniture rotary system 400.

Figure 19:
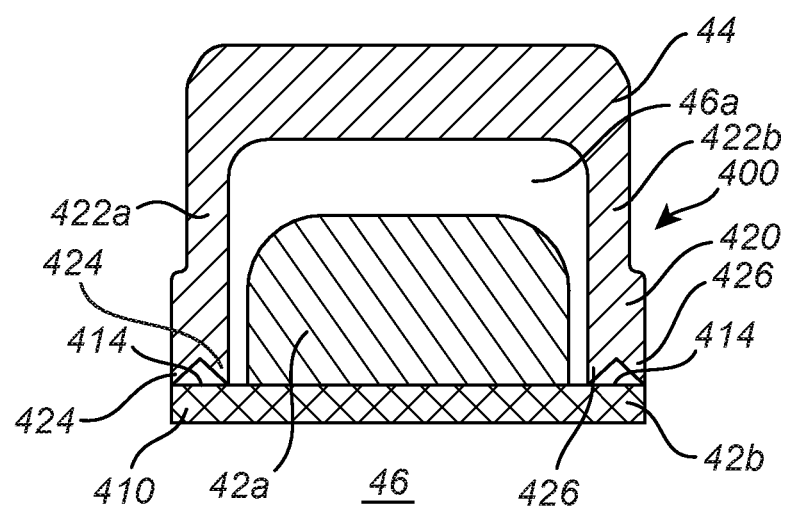
FIG. 19 is a cross-sectional view of the wheel arrangement shown in FIG. 18, further showing a rotary system.

Details of the furniture rotary system 400 are further shown in FIG. 19. The rim 42b forms a rotational member in the form of a rotating member 410 and the support 44 forms a stationary member 420. The rotary system 400 is formed by the sliding interface between the stationary member 420 and the rotating member 410.

The rotating member 410 is thus preferably made of metal and it is provided with a sliding surface 414 in accordance with the description above, hence including a coating with a lacquer comprising a resin, and the lacquer in turn being coated with a lipophilic composition. The sliding surface 414 has a cylindrical shape due to the shape of the rim 42*b*. As is shown in FIG. 19 the sliding surface 414 may not be provided along the entire axial extension of the rotating member 410, but only at the axial ends extending out from the outer surface 42*a*.

The stationary member 420 has two side pieces 422*a*, 422*b* extending on both sides of the outer surface 42*a* of the wheel 42'. The cutout 46 of the support member 44 thus has a radial extension forming a space 46*a* between the side pieces 422*a*, 422*b* such that the outer surface 42*a* of the wheel 42' may fit therein. Each side piece 422*a*, 422*b* engages with the rotating member 410 via one or more blades or protrusions 424, 426 extending along the perimeter of the respective side piece 422*a*, 422*b*. The side pieces 422*a*, 422*b* may thus be made of a plastic material comprising a polymer in line with the description above. The blades 424, 426 are further configured in line with the general description of the blades above. The blades 424, 426 may not necessarily extend along the entire extension of the respective side piece 422*a*, 422*b*, but they may be configured as a series of separated blades. Also, although each side piece 422*a*, 422*b* is provided with two parallel blades 424, 426 any suitable number of parallel blades is possible.

For further improving the lateral alignment of the side pieces 422*a*, 422*b* relative the rotating member 410 the rotating member 410 may be provided with circular depressions (not shown) similar to the depressions 116 described with reference to FIG. 7.

Figure 20:
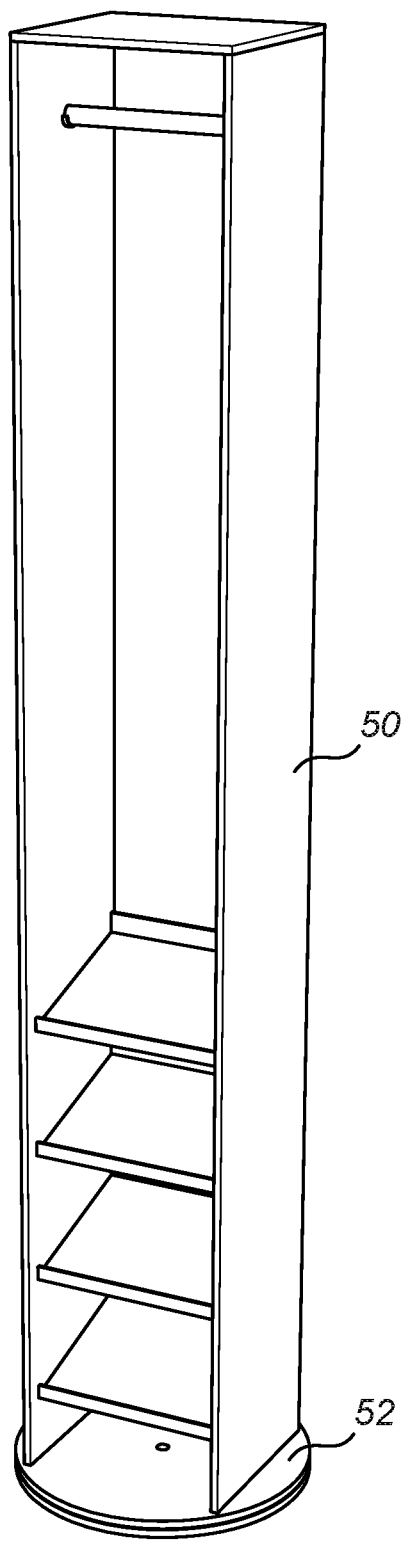
FIG. 20 is an isometric view of a shelf unit.
Figure 21:
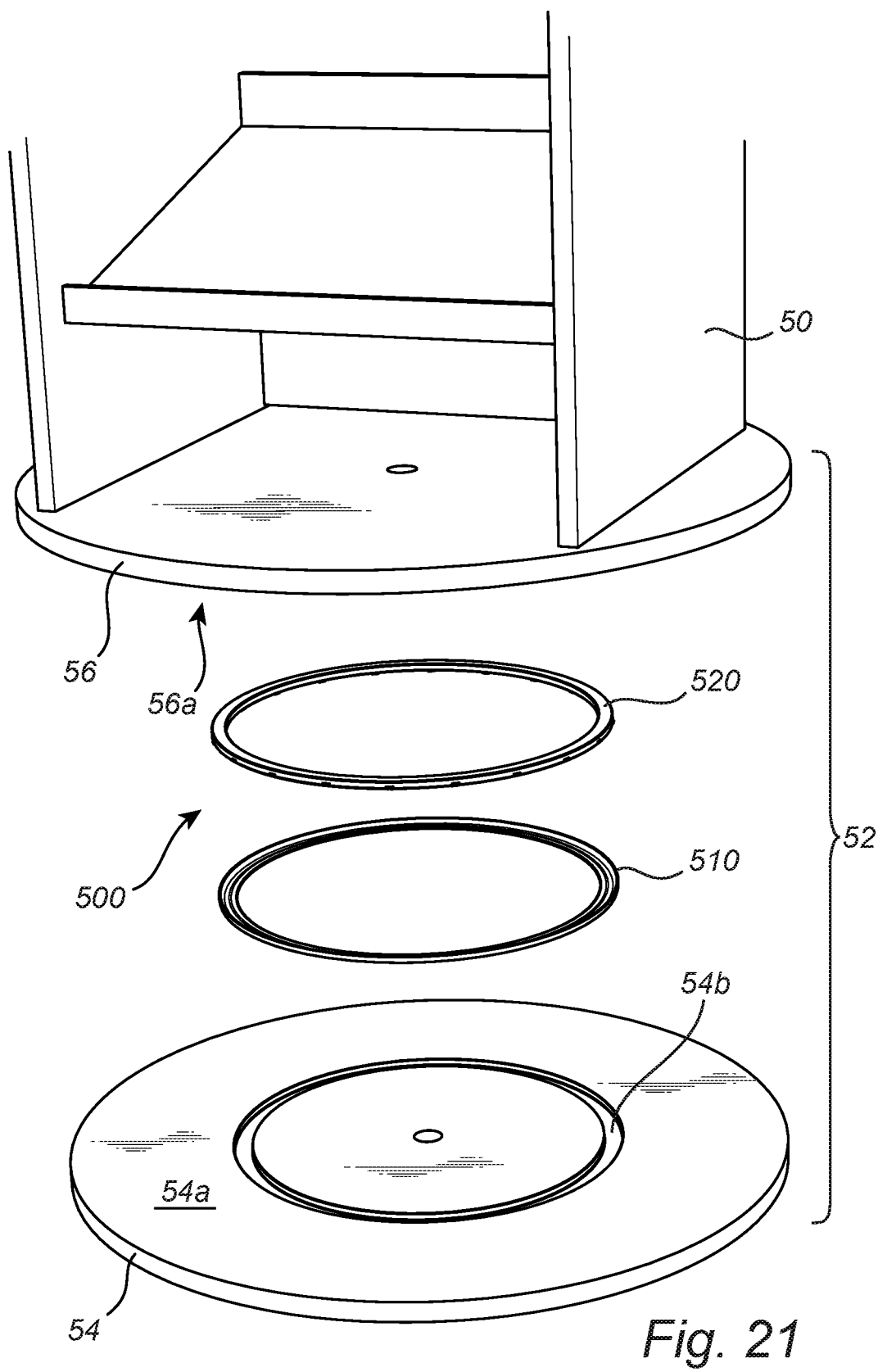
FIG. 21 is an exploded view of a rotary support for the shelf unit shown in FIG. 20.

In FIG. 20 another example of a piece of furniture, here in the form of a shelf unit 50, is shown. The shelf unit 50 is mounted on a support 52, which support 52 has the form of a furniture turning plate and allows for a rotation of the shelf unit 50 around a vertical axis. The support 52 is further shown in FIG. 21. The support 52 has a bottom part 54 which rests on the floor or ground in a fixed manner. The bottom part 54 is shown as a circular disc, but other shapes are possible. Preferably, the upper surface 54*a* of the bottom part 54 is planar. The support 52 also comprises an upper part 56 onto which the shelf unit 50 is mounted. The shelf unit 50 may be fixedly attached to the upper part 56, although the weight of the shelf unit 50 may be sufficient to provide a sufficiently stable connection between the shelf unit 50 and the upper part 56. The underside 56*a* of the upper part 56 is preferably planar.

For allowing rotation of the shelf unit 50 a furniture rotary system 500 is provided. The furniture rotary system 500 forms part of the support 52 and includes a stationary member 510 and a rotational member in the form of a rotating member 520. The stationary member 510 may be realized by a U- or L-shaped circular insert which is securely fitted into a circular recess 54*b* provided at the upper surface 54*a* of the bottom part 54.

The rotating member 520 is formed as a circular member attached to the underside 56*a* of the upper part 56.

When assembled the rotary system 500 will operate according to the following. The rotating member 520 is positioned concentrically with the stationary member 510 such that the rotating member 520 is fully received in the stationary member 510. During rotation, the rotating member 520 will slide relative the stationary member 510.

Figure 22:
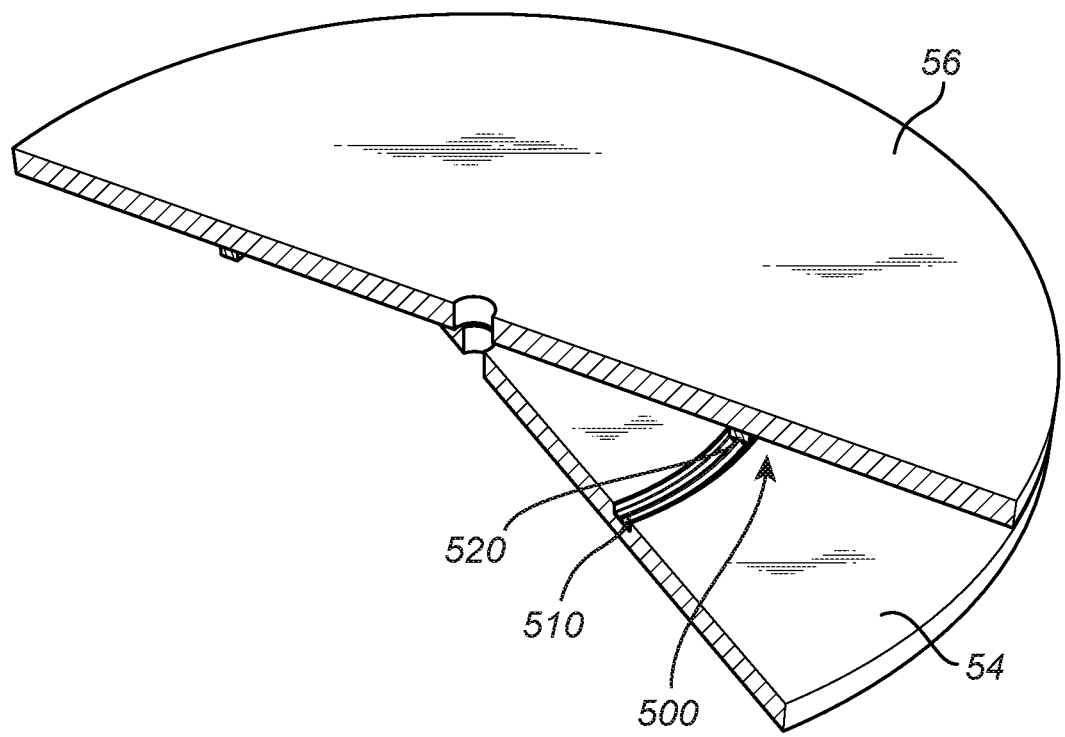
FIG. 22 is an isometric view of parts of a rotary system included in the rotary support shown in FIG. 21.
Figure 23:
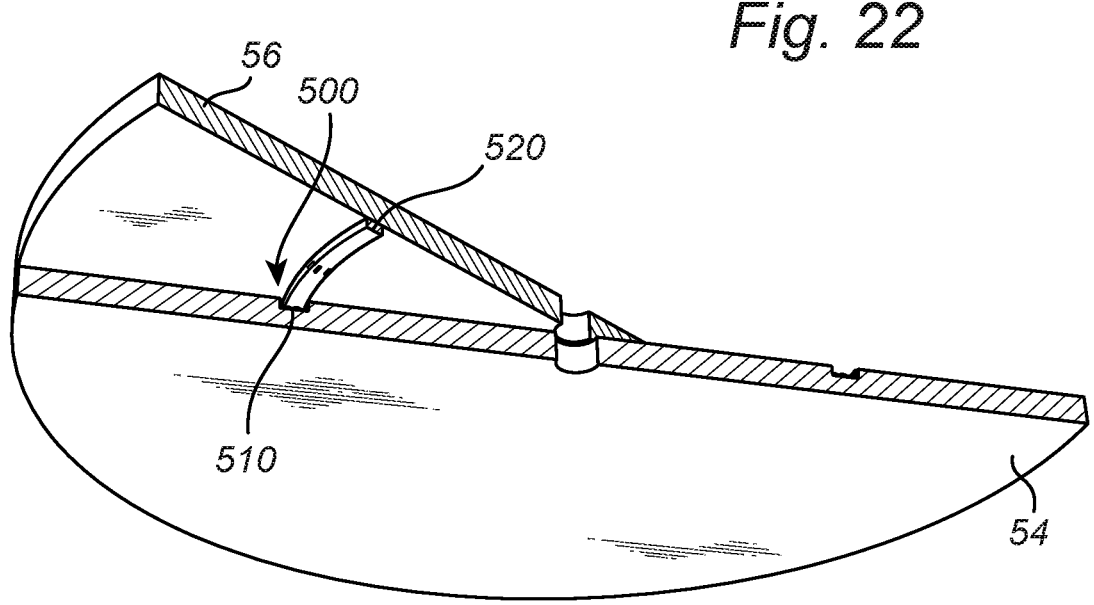
FIG. 23 is an isometric view of parts of the rotary system included in the rotary support shown in FIG. 21.

This is shown in FIGS. 22 and 23, from which it is clear that the rotating member 520 may slide within the stationary member 510.

Figure 24:
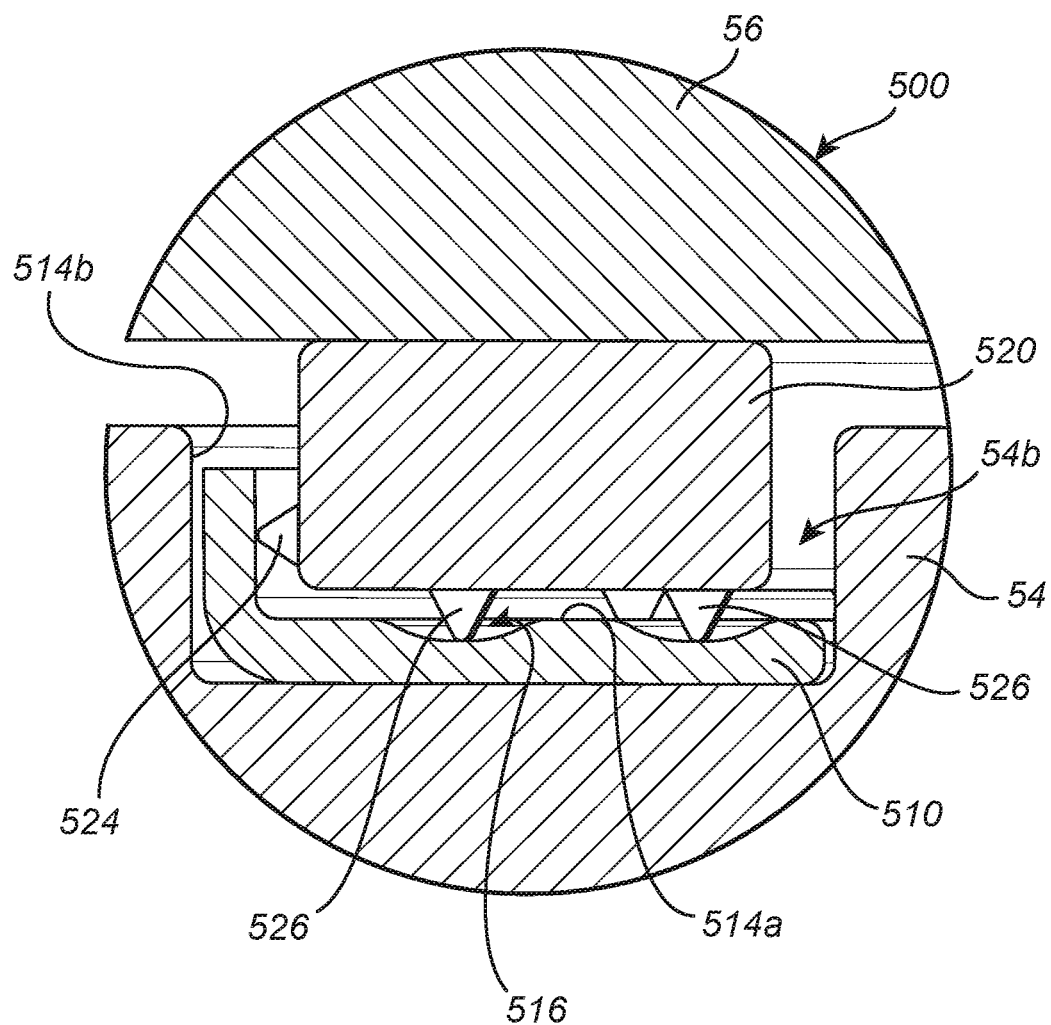
FIG. 24 is a cross-sectional view of engagement between two members of the rotary system shown in FIGS. 22 and 23.

A cross-section of the furniture rotary system 500 is shown in FIG. 24. Here, the stationary member 510 is not U-shaped but rather L-shaped. It should be noted that the exact shape of the stationary member 510 could vary, but preferably the stationary member 510 should have at least one substantially horizontal surface 514*a* and one substantially vertical surface 514*b*. These surfaces 514*a*, 514*b* are treated such that they exhibit a sliding surface 514 in accordance with the description above, hence including a coating with a lacquer comprising a resin, and the lacquer in turn being coated with a lipophilic composition. For this, the insert forming the stationary member 510 may be made of metal.

The rotating member 520 is received by the stationary member 510. The rotating member 520 is further provided with blades or protrusions 524, 526. A first blade 524 is arranged in the horizontal direction, thus facing the vertical sliding surface 514*b* of the stationary member 510. Second blades 526 are arranged in the vertical direction thus facing the horizontal sliding surface 514*a* of the stationary member 510. The vertical blades 526 are arranged concentrically.

Each blade 524, 526 may extend along the entire rotating member 520. In other embodiments each blade 524, 526 may be divided into a series of spaced apart blades 524, 526, each such blade 524, 526 being in the range of 1-10 mm in length. This is actually shown in FIG. 23, where it can be seen that the distance between two adjacent blades 524, 526 within the same set of blades is substantially larger than the length of each blade 524, 526.

For further improving the lateral alignment of the rotating member 520 relative the stationary member 510 the stationary member 510 may be provided with circular depressions 516 similar to the depressions 116 described with reference to FIG. 7.

It should be noted that it would be possible to exchange the positions of the stationary member 510 and the rotating member 520, such that the insert 510 is arranged at the upper part 56 (and thus being rotatable) and the member 520 being arranged at the lower part (and thus being stationary).

Furthermore there is, according to an embodiment, provided a method for providing a sliding surface 114, 214, 314, 414, 514 for a rotary system 100, 200, 300, 400, 500. In such a method there is provided a sliding surface 114, 214, 314, 414, 514 having a slide surface coated with a lacquer comprising a resin. In order to provide the sliding surface 114, 214, 314, 414, 514 with lowered friction, the lacquer is, at least partly, coated with a lipophilic composition coating. Aspects of the sliding surface 114, 214, 314, 414, 514, the lacquer, and the lipophilic composition coating have been provided herein above and are applicable to this embodiment as well. In applying the lipophilic composition to provide the lipophilic composition coating, the lipophilic composition may firstly be heated, such as melted, to reduce its viscosity. Further, the lipophilic composition may be dissolved in a solvent to facilitate application. After application, the solvent may be evaporated, at least partly. The lipophilic composition to provide the lipophilic composition coating may be applied in various ways, such as by spraying, smearing, painting, coating, spreading etc.

According to an embodiment, the lipophilic composition is applied by the end-consumer. Thus, the sliding surface 114, 214, 314, 414, 514, the rotary system 100, 200, 300, 400, 500 or arrangements comprising the sliding surface 114, 214, 314, 414, 514 may be provided together with a lipophilic composition to be applied by the end-consumer, i.e. the lacquer is un-coated upon delivery.

Similarly, another embodiment relates to the use of such a lipophilic composition, as described herein as an irreversibly bound lubricant for a sliding surface 114, 214, 314, 414, 514. By "irreversibly bound lubricant" is, according to an embodiment, meant that the lubricant is not removed from the slide surface 114, 214, 314, 414, 514 during normal operation of the furniture rotary system 100, 200, 300, 400, 500 and that it cannot be easily removed using mechanical means, e.g. it cannot easily be removed by wiping the sliding surface with a cloth. As described herein, the sliding surface 114, 214, 314, 414, 514 is coated with a lacquer comprising a resin. Aspects of the sliding surface 114, 214, 314, 414, 514, the lacquer, and the lipophilic composition coating have been provided herein above and are applicable to this embodiment as well.

Hereinbefore it has been described, in various embodiments, that one of the stationary member and the rotational member is provided with a sliding surface, and the other member slides against that sliding surface. It is readily appreciated that as alternative to the described embodiments the sliding surface could be provided on the other of the stationary member and the rotational member, thus obtaining the opposite arrangement compared to the described embodiment, such opposite embodiments also being within the scope of the present invention.

Without further elaboration, it is believed that one skilled in the art may, using the preceding description, utilize the present invention to its fullest extent. The preceding preferred specific embodiments are, therefore, to be construed as merely illustrative and not limitative of the disclosure in any way whatsoever.

EXAMPLES

The following examples are mere examples and should by no means be interpreted to limit the scope of the invention, as the invention is limited only by the accompanying claims.

General

All chemicals were obtained from Sigma-Aldrich. In providing mixtures, e.g. palmitic acid 10 mass % in liquid paraffin, the two compounds (e.g. 3 g palmitic acid and 27 g liquid paraffin) were mixed under heating to melt the mixture. Further, the mixtures were applied to the sliding surface 114, 214, 314, 414, 514 before solidifying.

The test procedure used was based on SS-EN 14882:205. In short, a sled with parallel plastic blades (four in total; two along each longitudinal slide axis) of POM was positioned on an anodized aluminum profile having been anaphoretically coated with an acrylic resin and subsequently heat cured to provide a lacquered slide surface. Aluminum profiles lacquered in this way are for example provided by Sapa Profiler AB, 574 38 Vetlanda, Sweden, and are marketed under the trade name SAPA HM-white, the materials being produced using the Sapa HM-white method which is based on the above referenced Honny method. In the friction measurements, a sled was pulled over the sliding surface at a constant speed of 500 mm/min and the force necessary to pull the sled was registered using an Instron 5966 tension testing system. The total weight of the sled corresponds to 10 N. Fresh profiles were used for each lipophilic composition, as the lipophilic compositions cannot be removed once applied. However, the profiles were re-used after the control experiments (no lipophilic compositions applied), washing and aging, respectively.

Example 1

By using the test procedure described above, the resulting friction from application of various lipophilic compositions to anodized, lacquered aluminum profiles was determined. The resulting dynamic friction, mean value from three test sequences, was registered and compared to the dynamic friction for anodized aluminum profiles provided with a lacquer but not coated with any lipophilic composition (=control). The results are provided in Table 1 and 2 below.

TABLE 1

Fatty acids in liquid paraffin

| Lipophilic composition | Wash | Ageing | Dynamic friction Mean (n = 3) |
|---|---|---|---|
| No (control) | — | — | 0.214 |
| MA5% | — | — | 0.049 |
| MA10% | — | 3 days | 0.046 |
| MA30% | — | — | 0.049 |
| MA10% | Yes | — | 0.041 |
| PA10% | — | 3 days | 0.047 |
| PA10% | Yes | — | 0.042 |
| SA10% | — | 3 days | 0.050 |
| SA10% | Yes | — | 0.044 |
| LP | — | 3 days | 0.053 |
| LP | Yes | — | 0.050 |

MA5%/10%/30% = Myristic acid 5/10/30 mass % in liquid paraffin
PA10% = Palmitic acid 10 mass % in liquid paraffin
SA10% = Stearic acid 10 mass % in liquid paraffin
LP = Liquid paraffin

TABLE 2

Triglycerides in liquid paraffin

| Lipophilic composition | Wash | Ageing | Dynamic friction Mean (n = 3) |
|---|---|---|---|
| No (control) | — | — | 0.214 |
| TM10% | — | — | 0.0510 |
| TM10% | Yes | — | 0.0524 |
| TP10% | — | 3 days | 0.0454 |
| TP10% | — | 6 weeks | 0.0513 |
| TP10% | Yes | — | 0.0440 |
| TS10% | — | — | 0.0524 |
| TS10% | Yes | — | 0.0504 |
| LP | — | — | 0.053 |
| LP | Yes | — | 0.050 |

TM10% = Trimyristate 10 mass % in Liquid paraffin
TP10% = Tripalmitate 10 mass % in Liquid paraffin
TS10% = Tristearate 10 mass % in Liquid paraffin
LP = Liquid paraffin

TABLE 3

Fatty acids in liquid paraffin

| Lipophilic composition | Wash | Dynamic friction Mean (n = 3) |
|---|---|---|
| LP | — | 0.054 |
| LP | Yes | 0.042 |
| LA10% | — | 0.058 |
| LA 10% | Yes | 0.041 |
| LA 30% | — | 0.046 |
| LA 30% | Yes | 0.039 |
| LA 50% | — | 0.048 |
| LA 50% | Yes | 0.036 |
| LA 70% | — | 0.041 |
| LA 70% | Yes | 0.036 |
| Coconut oil | — | 0.033 |
| Coconut oil | Yes | 0.037 |

LA10/30/50/70% = Lauric acid 10/30/50/70 mass % in Liquid paraffin

As can be seen from Table 1 and 2, the resulting dynamic friction was reduced by about 75% by applying a lipophilic compositions to the anodized aluminum profiles, though the initial dynamic friction of the un-coated anodized aluminum profiles was not that high. Furthermore, whereas the dynamic friction remained low and nearly the same for the coated profiles over repeated cycles, the dynamic friction for un-coated anodized aluminum profiles was significantly increased (seizing) already after less than 20 test cycles.

It can also be seen from the above tables 1 and 2 that the tests including fatty acids or triglycerides resulted in a somewhat lower friction compared to pure Liquid paraffin, in particular when the fatty acid is myristic acid or palmitic acid, and when the triglyceride is tripalmitate. Coconut oil, being a mixture of various triglycerides, in which lauric acid is the most common fatty acid residue, provided very low friction (cf. Table 3). Further, neither aging nor washing (wiping by a wet cloth 6 times, followed by wiping 4 times with a dry cloth) had any significant effect on the dynamic friction.

Example 2

By using the test procedure described above, the resulting friction at various loads (5, 10 and 20 N, respectively) using liquid paraffin as the lipophilic composition coating was determined. Increasing the load did not result in increased friction. On the contrary, the lowest load (5 N) displayed the highest friction (friction value 0.052 (at 5 N) vs. friction value 0.045 (at 10 N)/0.046 (at 20 N)).

Example 3

In an additional experiment, a corresponding aluminum bar, but without any lacquer, was used. Use of palmitic acid 10 mass % in liquid paraffin as lubricant on the non-lacquered bar resulted in a dynamic friction of 0.1132, i.e. more than 100% higher than corresponding dynamic friction obtained with the lacquered aluminum bar (cf. Table 1; 0.042 and 0.047, respectively).

Example 4

In additional examples also steel profiles as well as other lacquers were evaluated.

Lacquers: Teknotherm 4400 (Teknos)—wet spray lacquer, Standofleet® (Standox) wet spray lacquer, Powercron® 6200HE (PPG)—cationic epoxy electrocoat, Interpon AF (AkzoNobel)—powder coating, and Alesta® (Axalta)—powder coating.

Profiles: Aluminium (Al), and steel (Fe)

TABLE 4

Coconut oil on aluminum and steel profiles

| Lacquer | Profile | Dynamic friction Mean (n = 3) | Profile | Dynamic friction Mean (n = 3) |
| --- | --- | --- | --- | --- |
| Teknotherm | Al | 0.040 | Fe | 0.050 |
| Standofleet | Al | 0.045 | Fe | 0.048 |
| Interpon AF | Al | 0.024 | Fe | 0.034 |
| Powercron | Al | 0.021 | Fe | 0.041 |
| Alesta | Al | 0.025 | Fe | 0.038 |

As can be seen from Table 4, the aluminum profiles displayed lower friction than the steel profiles though also the steel profiles displayed a very low friction. Further, whereas some of the alternative lacquers displayed comparable or lower friction than the SAPA HM-white profiles (dynamic friction mean: 0.033), the wet lacquered profiles displayed slightly higher friction. Without being bond to any theory, this may be due to wet lacquered profiles inherently having somewhat thicker lacquer and/or varying thickness of the lacquer. Further, in comparing coconut oil and liquid paraffin (data not shown) it was seen that coconut oil generally provided somewhat lower friction.

Example 5

Tests were also performed in a full-scale test rig using a wardrobe door with a weight of 8.5 kg and using two sliding members and a sliding surface of the type of sliding surface 114 which is described with reference to FIG. 8. When applying a lipophilic composition coating comprising 100% Liquid paraffin to the lacquer of the sliding surface the wardrobe door could still be moved back and forth without problems and at still a low friction after 500 000 cycles of reciprocation of the wardrobe door. In a comparative test the same equipment was used, but without any lipophilic composition coating being applied on the lacquer. In the latter case the tests had to be stopped already after less than 30 cycles as the test equipment was about to break down due to rapidly increasing friction between the sliding members and the sliding surface (seizing).

It should be realized that the embodiments described above are not limited by the exact number and dimensions described herein.

Although the present invention has been described above with reference to specific embodiments, it is not intended to be limited to the specific form set forth herein. Rather, the invention is limited only by the accompanying claims.

The invention claimed is:

1. A furniture rotary system for a piece of furniture, said furniture rotary system comprising: a rotational member and a stationary member, and a sliding rotary connection formed between the rotational member and the stationary member, wherein said sliding rotary connection comprises at least one sliding surface being coated with a lacquer comprising a resin, wherein said lacquer in turn is at least partly coated with a lipophilic composition coating to provide a slide layer with a lowered friction, wherein the sliding surface provided on one of the stationary member and the rotational member, and the other one of said stationary member and said rotational member is in sliding contact with the sliding surface, and wherein that member being in sliding contact with the sliding surface is made of a plastic.

2. The rotary system according to claim 1, wherein the sliding surface is arranged in the horizontal plane, and wherein the rotational member is arranged to rotate around a vertical axis.

3. The rotary system according to claim 1, wherein the sliding surface is arranged as a cylinder surface extending around a horizontal axis of the stationary member, and wherein the rotational member is arranged to rotate around the horizontal axis.

4. The rotary system according to claim 1, wherein that member being in sliding contact with the sliding surface comprises at least one blade extending in the rotational direction.

5. The rotary system according to claim 4, wherein each blade forms one individual contact point in contact with the sliding surface, the contact area of each individual contact point being less than 3 mm$^2$.

6. The rotary system according to claim 1, wherein the plastic member being in sliding contact with the sliding surface is made of a plastic comprising a polymer with polar groups.

7. The rotary system according to claim 1, wherein the plastic member being in sliding contact with the sliding surface is in its entirety made from a plastic.

8. The rotary system according to claim 1, wherein the sliding surface is made from a material having a Vickers hardness of at least 50 MPa.

9. The rotary system according to claim 1, wherein the sliding surface is made of aluminum and/or steel.

10. The rotary system according to claim 1, wherein the resin of the lacquer comprises polar groups being hydroxyl groups, carboxylic acid groups, amide groups, cyano groups (nitrile groups), halide groups, sulfide groups, carbamate groups, aldehyde groups, and/or ketone groups.

11. The rotary system according to claim 1, wherein the sliding surface is formed by an aluminum member having a surface layer onto which the lacquer is applied.

12. The rotary system according to claim 1, wherein the lipophilic composition coating comprises compounds comprising C6 to C40, non-aromatic hydrocarbyl groups, being alkenyl groups and/or alkyl groups, being alkyl groups.

13. The rotary system according to claim 1, wherein the lipophilic composition coating present on the lacquer comprises triglycerides and/or fatty acids.

14. The rotary system according to claim 1, wherein at least one of the rotational member and the stationary member comprises both a horizontal and a vertical sliding surface to provide support for the other member in both vertical and horizontal directions.

15. The rotary system according to claim 1, wherein at least one of the rotational member and the stationary member being a threaded rod, and the other member being a nut co-operating with the threaded rod to provide a furniture extension system.

16. The rotary system according to claim 1, wherein the rotational member is arranged on a wheel member of a wheel arrangement, and wherein the stationary member is arranged on a furniture mounting part adapted for mounting the wheel member to a piece of furniture.

17. A cabinet having at least one swinging door attached to it, wherein the at least one door is rotatably connected to the cabinet by means of a rotary system according to claim 1, and wherein the sliding surface is provided on a circular member securely attached to the cabinet, or on a circular member securely attached to the at least one door.

18. A sit to stand table having at least one leg being adjustable in height direction by means of a rotary system according to claim 1, wherein the sit to stand table further comprises an electrical motor being in drive connection with a threaded rod as the rotational member, wherein the sliding surface is provided on the threaded rod, and said threaded rod is in threaded connection with a nut as the stationary member.

19. A wheel arrangement comprising a shaft forming a stationary member and a hub forming a rotational member, together forming a rotary system according to claim 1, wherein the shaft, forming the stationary member, is provided with the sliding surface.

20. A wheel arrangement comprising a fixed support forming a stationary member, and a rotatable rim forming a rotational member, together forming a rotary system according to claim 1, wherein the rim, forming the rotational member, is provided with the sliding surface.

21. A furniture turning plate, wherein the furniture turning plate comprises a rotary system according to claim 1, wherein the furniture turning plate comprises an upper part and a lower part being connected to each other by means of the rotary system.

\* \* \* \* \*